United States Patent
Yadav et al.

(10) Patent No.: US 12,002,091 B2
(45) Date of Patent: Jun. 4, 2024

(54) TECHNOLOGY SYSTEM FOR ASSISTING FINANCIAL INSTITUTIONS IN DEBT COLLECTION

(71) Applicant: Oracle Financial Services Software Limited, Mumbai (IN)

(72) Inventors: Rahul Yadav, Alwar (IN); Veresh Jain, Bangalore (IN); Shubham Negi, Bilaspur (IN); Rahul Kiran Gaddam, Nizamabad (IN); Phanindra Choda, Bangalore (IN)

(73) Assignee: Oracle Financial Services Software Limited, Maharashtra (IN)

( * ) Notice: Subject to any disclaimer, the term of this patent is extended or adjusted under 35 U.S.C. 154(b) by 100 days.

(21) Appl. No.: 17/659,017

(22) Filed: Apr. 13, 2022

(65) Prior Publication Data

US 2023/0177602 A1    Jun. 8, 2023

(30) Foreign Application Priority Data

Dec. 3, 2021   (IN) .............................. 202121056120

(51) Int. Cl.
*G06Q 40/00*   (2023.01)
*G06F 18/214*   (2023.01)
*G06F 18/23*   (2023.01)
*G06N 20/00*   (2019.01)
*G06Q 40/03*   (2023.01)

(52) U.S. Cl.
CPC .......... *G06Q 40/03* (2023.01); *G06F 18/214* (2023.01); *G06F 18/23* (2023.01); *G06N 20/00* (2019.01)

(58) Field of Classification Search
CPC ........ G06Q 40/00; G06Q 40/02; G06Q 40/03; G06N 20/00; G06F 18/214; G06F 18/23
USPC .................................................. 705/4, 35–45
See application file for complete search history.

(56) References Cited

U.S. PATENT DOCUMENTS

| | | | |
|---|---|---|---|
| 2019/0095895 A1* | 3/2019 | Smith .................. | G06Q 20/325 |
| 2019/0318293 A1* | 10/2019 | Neuweg ......... | G06Q 10/063112 |
| 2020/0160469 A1* | 5/2020 | Hoskins ................ | G06Q 20/14 |
| 2020/0265512 A1* | 8/2020 | James .................... | G06Q 40/03 |
| 2020/0380309 A1* | 12/2020 | Weider ................ | G06F 18/2178 |
| 2021/0217102 A1* | 7/2021 | Chen .................... | G06F 16/2465 |
| 2022/0207295 A1* | 6/2022 | Stanevich ............ | G06F 18/2185 |
| 2023/0103753 A1* | 4/2023 | Luo ......................... | G06F 40/40 |
| | | | 704/9 |

* cited by examiner

*Primary Examiner* — Eric T Wong
*Assistant Examiner* — Mohammed H Mustafa
(74) *Attorney, Agent, or Firm* — IPHORIZONS PLLC; Narendra Reddy Thappeta

(57) ABSTRACT

According to an aspect, a technology system maintains an account data specifying the details of multiple accounts including a specific set of accounts as being delinquent. Upon receiving a feature set to be used, the system clusters the multiple accounts into groups based on the feature set. The system generates a multi-classification model for assignment of agents to the accounts based on the group qualifiers associated with the groups and the feature set. The system then identifies a target group likely to present problems with debt collection, assigns, using the multi-classification model, a corresponding agent for each account of the group and determines a recommended recovery strategy for each assignment. The system provides the details of the group, the corresponding agents assigned and the recommended recovery strategy for each assignment.

20 Claims, 24 Drawing Sheets

Account Data — 610

| Account_Id | Acc_Details | Acc_Loan_Amt | Acc_Dlq_Category | Aco_Acc_Condition_Cd | Acc_Loan_Type | Collateral_Type_Cd | Cust_Nationality_Cd | Cust_Employment_Status |
|---|---|---|---|---|---|---|---|---|
| A1001 | Krishna Rao | 500000 | D | DELQ | Land | Land | India | Employed |
| A1002 | Syed | 1500000 | N | NDELQ | House | House | India | Employed |
| A1003 | Vinay Kumar | 600000 | D | DELQ | Vehicle | Vehicle | India | Unemployed |
| A1004 | Sriram | 300000 | N | NDELQ | Vehicle | Vehicle | India | Unemployed |
| A1005 | Ankita | 800000 | D | BKRP | Land | House | India | Employed |
| A1006 | Nancy | 250000 | N | CIIC | House | Land | India | Unemployed |

Cluster Data

| Cluster Id | ACC_COLLATERAL_TYPE_CD | ACC_DLQ_CATEGORY | ACC_DLQ_DAYS | ACC_DUE_TOTAL_AMT | ACC_OUTSTANDING_TOTAL_AMT | ACC_POTNL_DLQ_DAYS |
|---|---|---|---|---|---|---|
| C1 | House | L | [28; 240.9] | [0; 285800.6] | [9009.1; 85121.3] | [29; 589] |
| C2 | Vehicle | 40 | [0; 80.9] | [0; 421500.90] | [9890; 17699.5] | [350.7; 420.6] |
| C3 | Land | 50 | [35; 120.3] | [0; 302040.4] | [10086.3; 90175.8] | [30; 600] |
| C4 | Vehicle | 60 | [45.4444; 90.8889] | [0; 381500.34] | [8586.4; 15175.8] | [344.5; 471.5] |
| C5 | Vehicle | L | [0; 45.4444] | [0; 381500.34] | [11881.4; 15175.8] | [344.5; 408] |
| C6 | Land | 20 | [0; 409] | [0; 267070.4] | [(-)1297.6; 25060] | [27; 535] |
| C7 | Vehicle | 30 | [0; 90.8889] | [0; 381500.34] | [8586.4; 15175.8] | [344.5; 408] |

*FIG. 6B*

User Segmentation Data

| Account_Id | Cluster Id | Probability of Delinquency | Attribute Thresholds |
|---|---|---|---|
| A1001 | C2 | 0.6 | `<Details algorithm="O-Cluster Clustering" cluster="2">`<br>`<Attribute name="Acc_Loan_Amt" actualValue="500000" weight="0.94" rank="1"/>`<br>`<Attribute name="ACC_COLLATERAL_TYPE_CD" actualValue="House" weight="0.47" rank="2"/>`<br>`<Attribute name="Aco_Acc_Condition_Cd" actualValue="DELQ" weight="0.35" rank="3"/>`<br>`</Details>` |
| A1002 | C5 | 0.2 | ... |
| A1003 | C1 | 0 | ... |
| A1004 | C2 | 0.6 | `<Details algorithm="O-Cluster Clustering" cluster="2">`<br>`<Attribute name="Aco_Acc_Condition_Cd" actualValue="NDELQ" weight="0.62" rank="1"/>`<br>`<Attribute name="ACC_COLLATERAL_TYPE_CD" actualValue="Vehicle" weight="0.33" rank="2"/>`<br>`<Attribute name="Acc_Loan_Amt" actualValue="300000" weight="0.28" rank="3"/>`<br>`</Details>` |
| A1005 | C2 | 0.6 | ... |
| A1006 | C6 | 0.3 | `<Details algorithm="O-Cluster Clustering" cluster="6">`<br>`<Attribute name="Cust_Employment_Status" actualValue="Cust_Employment_Status" weight="0.29" rank="1"/>`<br>`<Attribute name="Acc_Loan_Type" actualValue="House" weight="0.18" rank="2"/>`<br>`<Attribute name="Cust_Nationality_Cd" actualValue="India" weight="0.15" rank="3"/>`<br>`</Details>` |

*FIG. 6C*

Intelligent Segmentation

Company *  ALL ▼

Branch *  ALL ▼

Account Conditions *  DELINQUENT ▼   Submit

Cluster | Segment | Insights

710

Records of Cluster - 7  Create                                                X

| ATTRIBUTE_NAME | ATTRIBUTE_VALUE |
|---|---|
| ACC_COLLATERAL_TYPE_CD | VEHICLE |
| ACC_DLQ_CATEGORY | 30 |
| ACC_DUE_TOTAL_AMT | [0; 3815.34] |
| ACC_POTNL_DLQ_DAYS | [344.5, 408] |
| ACC_DLQ_DAYS | 0 to 90.8889 |
| ACC_OUSTANDING_TOTAL_AMT | 8586.4 to 15175.8 |

760

Cluster Id: 2
Record Count: 258

Cluster Id: 5
Record Count: 32

Cluster Id: 4
Record Count: 226

**Cluster Id: 7
Record Count: 131**

Cluster Id: 6
Record Count: 95

**Cluster Id: 9
Record Count: 33**

Cluster Id: 8
Record Count: 62

**Cluster Id: 13
Record Count: 31**

**Cluster Id: 12
Record Count: 31**

Agent Data

| Agent_Id | Agent_Name | Agent_Branch | Agent_Responsibility | Acc_Queue | Acc_Loan_Type | Agent_Skill set | Agent_Work_Exp | Agent_Native_Lang | Agent_Time_Zone |
|---|---|---|---|---|---|---|---|---|---|
| RA401 | Sam Joshi | MH25 | Recovery Agent | 8 | Vehicle | Email | 1 year | Kannada | GMT+5:30 |
| RA402 | Aarushi | WT32 | Recovery Manager | 7 | House | Call | 2 years 2 months | English | GMT+5:30 |
| RA403 | Viraj | BL25 | Relationship Manager | 3 | Land | Call | 8 years | Tamil | GMT+5:30 |
| RA404 | Madhumita | RR91 | Recovery Agent | 5 | House | Email | 6 years 3 months | Hindi | GMT+5:30 |
| RA405 | Imaran | TH04 | Recovery Agent | 9 | Vehicle | Call | 4 years 5 moths | Bengali | GMT+5:30 |
| RA406 | Alex | HL04 | Recovery Agent | 2 | Vehicle | Email | 11 months | Telugu | GMT+5:30 |

*FIG. 9A*

Assignment Data

| Agent_Id | Agent_Name | Task_Id | Account_Id | Confidence Score | Attribute Ranking |
|---|---|---|---|---|---|
| RA401 | Sam Joshi | Recovery | A1004 | 1 | <Details algorithm="Random-Forest" class="1"> <Attribute name="Acc_Loan_Type" actualValue="Vehicle" weight=".27" rank="1"/> <Attribute name="Agent_Responsibility" actualValue="Recovery Agent" weight=".24" rank="2"/> <Attribute name="Agent_Skillset" actualValue="Email" weight=".15" rank="3"/> </Details> |
| RA402 | Aarushi | Recovery | A1002 | 5 | ... |
| RA403 | Madhumita | Recovery | A1001 | 3 | <Details algorithm="Random-Forest" class="1"> <Attribute name="Agent_Work_Exp" actualValue="8 years" weight="0.22" rank="1"/> <Attribute name="Agent_Native_Lang" actualValue="Tamil" weight="0.18" rank="2"/> <Attribute name="Agent_Responsibility" actualValue="Relationship Manager" weight=".10" rank="3"/> </Details> |
| RA404 | Imaran | Recovery | A1005 | 7 | ... |
| RA405 | Alex | Recovery | A1006 | 8 | ... |
| RA406 | Naveen Jain | Recovery | A1003 | 6 | ... |

*FIG. 9B*

| State_Id | Acc_Attribute_Condition | Agent_Attribute_Condition | Action_Condition | Description |
|---|---|---|---|---|
| S1 | Acc_Loan_Amt = High | Agent_Work_Exp = Less | None | High loan amount with less experienced recovery agent |
| S2 | Acc_Loan_Amt = High | Agent_Work_Exp = Less | Call = Fail | High loan amount with less experienced recovery agent and Borrower not responding on call |
| S3 | Acc_Loan_Amt = High | Agent_Work_Exp = Less | Call = Fail Text = Fail Email = Fail | High loan amount with less experienced recovery agent and Borrower not responding on call, text and email |
| S4 | Acc_Dlq_Category = Few Non-payment | Agent_Work_Exp = High | None | Few missed EMIs from a regular paying account with Highly experienced recovery agent |
| S5 | Acc_Loan_Amt = Low | None | Home Visit = Fail | Low loan amount with borrower not present at the home location |

*FIG. 11B*

| State → | Strategy ↑ Text | Call | Email | Home Visit | Office Visit | Legal Action | Drop Recovery |
|---|---|---|---|---|---|---|---|
| S1 | 0.2 | 0.1 | 0.15 | 0.05 | 0.05 | 0.01 | 0.01 |
| S2 | 0.1 | 0.2 | 0.2 | 0.05 | 0.05 | 0.01 | 0.01 |
| S3 | 0.1 | 0.1 | 0.1 | 0.2 | 0.15 | 0.01 | 0.01 |
| S4 | 0.2 | 0.1 | 0.2 | 0.05 | 0.05 | 0.01 | 0.01 |
| S5 | 0.05 | 0.05 | 0.05 | 0.05 | 0.15 | 0.1 | 0.01 |
| S6 | 0.05 | 0.05 | 0.05 | 0.05 | 0.05 | 0.1 | 0.2 |
| ... | ... | ... | ... | ... | ... | ... | ... |

*FIG. 11C*

Intelligent Segmentation

Company *: ALL
Branch *: ALL
Account Conditions *: DELINQUENT
[Submit]

Cluster-7

| Account ID | Customer Name | ... | Agent ID | Agent Name | ... | Recommended Strategy Sequence |
|---|---|---|---|---|---|---|
| A1001 | Krishna Rao | ... | RA406 | Alex | ... | Text → Email → Call → Office Visit/Home Visit ... |
| A1003 | Vinay Kumar | ... | RA402 | Aarushi | ... | Email/Call → Office Visit/Home Visit ... |
| ... | ... | ... | ... | ... | ... | ... |
| A1010 | Mohan Das | ... | RA405 | Imaran | ... | Office Visit/Home Visit ... |
| A1005 | Nancy | ... | RA404 | Madhumita | ... | Drop Recovery |

*FIG. 12*

TECHNOLOGY SYSTEM FOR ASSISTING FINANCIAL INSTITUTIONS IN DEBT COLLECTION

PRIORITY CLAIM

The instant patent application is related to and claims priority from the co-pending India provisional patent application entitled, "ARTIFICIAL INTELLIGENCE (AI) SYSTEM FOR ASSISTING FINANCIAL INSTITUTIONS IN DEBT COLLECTION", Serial No.: 202121056120, Filed: 3 Dec. 2021, which is incorporated in its entirety herewith.

BACKGROUND OF THE DISCLOSURE

Technical Field

The present disclosure relates to a technology system for assisting financial institutions in debt collection.

Related Art

Debt collection refers to the process of pursuing payments of debts owed by individuals or businesses as is well known in the arts. In general, financial institutions offer lending and leasing facilities by arranging debts for customers. Customers, in turn, repay the debt, usually with interest, over a period of time in installments. Sometimes, customers may fail to pay the installments on time, and the corresponding customers and accounts are termed as being delinquent. Such delinquency necessitates debt collection.

Typically, financial institutions have collection (recovery) departments with a dedicated staff including recovery agents who reach out to the delinquent customers via various channels such as text messages (e.g., Short Message Service (SMS), instant messaging), email, call on mobile, call to office, personal visit, legal action, etc.

The effectiveness of debt collection can depend on allocation of appropriate agents for recovery from customers, as well as appropriate collection/recovery strategy. Aspects of the present disclosure are directed to a technology system for assisting financial institutions in debt collection.

BRIEF DESCRIPTION OF THE DRAWINGS

Example embodiments of the present disclosure will be described with reference to the accompanying drawings briefly described below.

FIG. 6A is an account table depicting the details of customers/accounts of a financial institution in one embodiment.

FIG. 6B is a cluster table specifying the details of the groups/clusters determined for accounts based on a feature set provided by a user in one embodiment.

FIG. 6C is a segmentation table specifying the association between the accounts and groups in one embodiment.

FIGS. 7A-7E depict various user interfaces provided to a user/administrator for viewing the details of the predicted groups/clusters in one embodiment.

FIG. 9A is an agent table specifying the details of the agents in one embodiment.

FIG. 9B is an assignment table specifying the assignments of agents to accounts in one embodiment.

FIG. 11B is a state definition table that defines the various states used in state tables in one embodiment.

FIG. 11C is a state table specifying the various tradeoffs between states and recovery actions/strategies in one embodiment.

FIG. 12 depicts a user interface provided to a user/administrator for viewing the details of the accounts of a targeted group in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
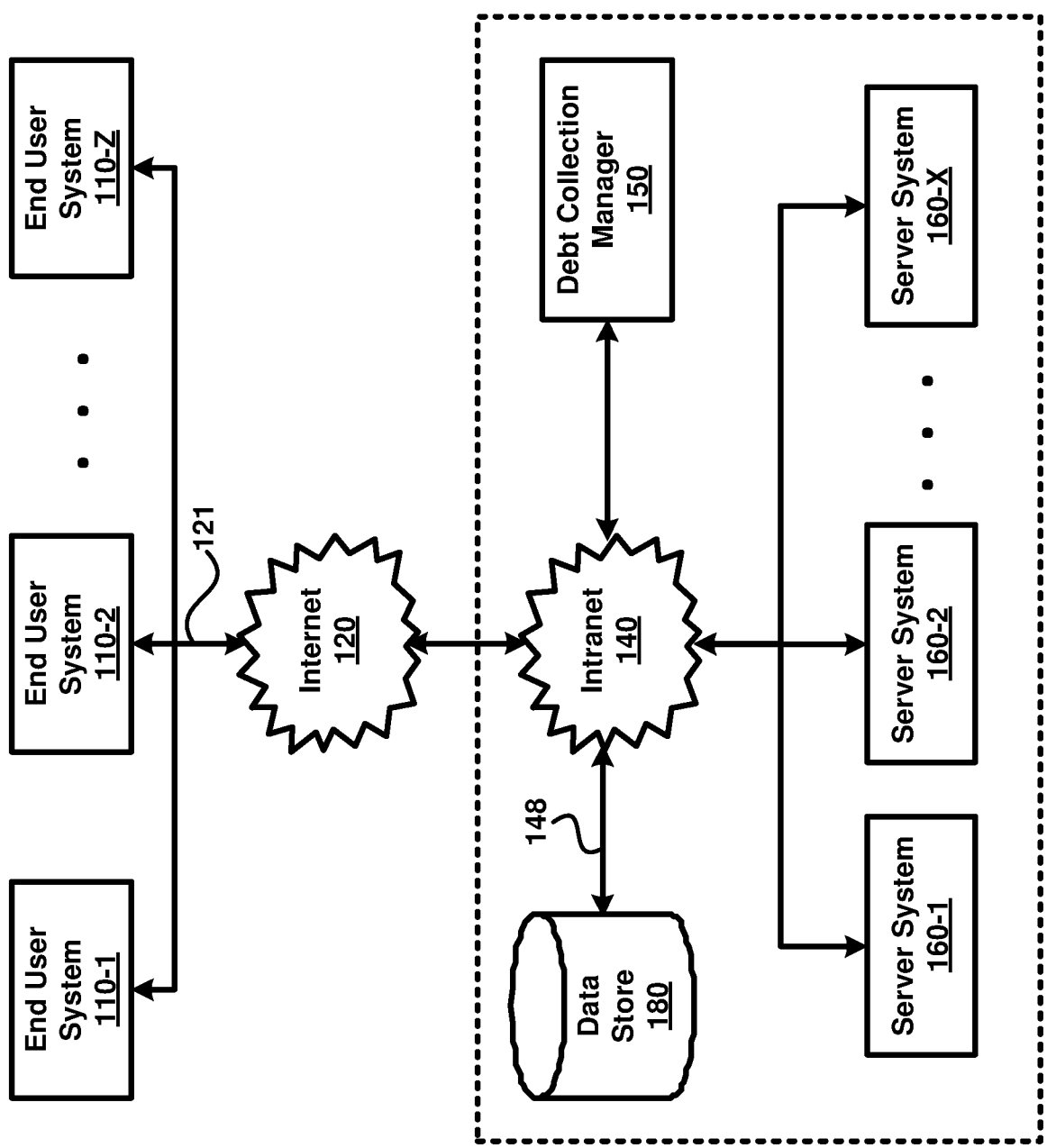
FIG. 1 is a block diagram illustrating an example environment (computing system) in which several aspects of the present disclosure can be implemented.

An aspect of the present disclosure is directed to a technology system for assisting financial institutions in debt collection. In one embodiment, a (digital processing) system maintains an account data specifying account attributes of multiple accounts, the account data indicating a specific set of accounts as being delinquent. Upon receiving a feature set containing account attributes of interest, the system clusters the multiple accounts into a set of groups based on account attributes while giving higher weightage to account attributes of interest. Each group is associated with group qualifiers. The system also generates a multi-classification model for assignment of agents to accounts based on recovery attributes of each agent and the group qualifiers, while giving higher weightage to account attributes of interest (of the feature set).

The system then identifies a target group likely to present problems with debt collection, the target group containing a material number of accounts indicated to be delinquent and a subset of accounts that are indicated not to be delinquent in the account data. The system assigns, using the multi-classification model, a corresponding agent for each account in the subset of accounts and also determines a recommended recovery strategy for each assignment of agent and account. The system provides details of the subset of accounts, the corresponding agent assigned to each of the subset of accounts and the recommended recovery strategy for each assignment.

Debt collection may be greatly enhanced by providing an integrated system which proactively identifies the potentially delinquent customers/accounts, assigns appropriate recovery agents, and recommends appropriate recovery strategy.

According to another aspect of the present disclosure, the system (noted above) generates a machine learning (ML) clustering model based on the account data and the received feature set and predicts the set of groups based on the ML clustering model. In one embodiment, the ML clustering model employs one of K-Means, O-Cluster and Expectation maximization algorithms.

According to one more aspect of the present disclosure, the account data (noted above) also specifies a corresponding delinquency status for each account. As such, the system (note above) also identifies a probability of delinquency for the target group based on weights associated with the corresponding delinquency statuses of the accounts contained in the target group.

According to yet another aspect of the present disclosure, the system (noted above) trains multiple machine learning (ML) classification models based on the set of recovery attributes of each agent and the respective set of group qualifiers of the set of groups. The system then selects a suitable ML classification model from the multiple ML classification models as the multi-classification model. In one embodiment, the multiple ML classification models employ one or more of logistic regression, SVMs, ensemble trees, boosting trees, naive Bayes, KNN and shallow neural networks. The selection of the suitable ML classification model is performed based on one or more of confusion matrix, accuracy, precision, recall, F1 score, ROC Curve, and gain and lift chart.

According to an aspect of the present disclosure, the system (noted above) maintains a reinforcement learning (RL) state table correlating a set of states to a set of strategies, the set of states representing corresponding combinations of group qualifiers and agent attributes. The system then identifies, for a first assignment of a first agent and a first account contained in the first group, a first strategy of the set of strategies as the recommended recovery strategy using the RL state table, a group qualifier associated with the first group and an agent attribute associated with the first agent.

According to another aspect of the present disclosure, the system (noted above) receiving from the first agent, feedback on the success or failure of the first strategy with the first account and updates the RL state table to reflect the received feedback. In one embodiment, the RL state table is a Q-table employing Q-Learning algorithm.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing end-user systems 110-1 through 110-Z (Z representing any natural number), Internet 120, intranet 140, server systems 160-1 through 160-X (X representing any natural number), debt collection manager 150 (DCM) 150 and data store 180. The end-user systems and server systems are collectively referred to by 110 and 160 respectively.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160, DCM 150 and data store 180, all typically provided within an enterprise (as indicated by the dotted boundary). In an embodiment, the enterprise is a financial institution (such as a bank, lending institution, etc.) providing financial services to users (customers). Internet 120 extends the connectivity of these (and other systems of the enterprise) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies the target application, the packet may be said to be directed to such application as well.

Data store 180 represents a non-volatile (persistent) storage facilitating storage and retrieval of a collection of data (e.g., financial transaction data such as debt disbursement, payment information, etc., user/customer profile data such as monthly salary, monthly expenditure, mortgages, current credit rating, payment history, etc.) by applications executing in server systems 160 (and also DCM 150). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of end-user systems 110 represents a system such as a personal computer, workstation, mobile device, computing tablet etc., used by users to generate user requests directed to software/enterprise applications executing in server systems 160. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Thus, in a financial institution, a user may be a customer initiating financial transactions such as banking transactions, credit card transactions, transactions related to securing and managing debts, etc. using end-user system 110. Alternatively, or in addition, a user may be an administrator in the financial institution performing administrative tasks such as entering data related to debts, configuring inputs to DCM 150, etc. using end-user systems 110.

Each of server systems 160 represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in data store 180) and/or data received from external sources (e.g., from the user) in performing the requested tasks/web service operations. The server system then sends the result of performance of the tasks/web service operations to the requesting end-user system 110. The results may be accompanied by specific user interfaces (e.g., web pages) for displaying the results to the requesting user. Thus, in a financial institution, each of server systems 160 facilitates the financial transactions initiated by customers (noted above).

In the prior art, financial institutions rely on human intuition, and use rule-based and statistical debt collection systems. Some of the drawbacks of such collection systems are: (1) A fixed and static collection strategy does not work for all types of customers and/or accounts. Even the same collection strategy that worked previously for an account/customer might not work again as the account conditions might change or country's/industries economic condition might change. (2) Rule-based or statistical methods fail to capture all the variations because as the dimensionality of the data increases, static rules and statistics can become the bottleneck and challenging to manage. (3) Manual rule-setting is an extensive process, requires domain expertise and are error-prone. With changing trends in historical data, rules need to be updated regularly. Grouping definitions based on criteria need to be routinely refined to increase the efficiency of debt recoveries and adapt to variations in the data. (4) Assignment of recovery agent is also generally a tedious task and requires a lot of effort from risk managers/collection administrative specialists to distribute the recovery tasks accurately. In most scenarios, proper analysis is not done on recovery agent efficiency. Recovery agents have various strategies to lead the recovery task; without proper data-oriented recommendations, they will find it challenging to pick an efficient approach. With an intelligent strategy recommendation system, the agent will not have to rely on trial-and-error methods that might unnecessarily waste time and money.

Accordingly, there is a general need for technology systems for assisting with more accurate and efficient debt collections that help save revenue of financial institutions by identifying the cause and delay of late payment, and making accurate decisions to collect the money before customer default. An automatic technology system that makes better and data-oriented decisions at different stages of the collection process is accordingly a necessity in such financial environments. Debt collection manager (DCM) 150 provided according to several aspects of the present disclosure represents such a technology system that assists financial institutions in debt collection as described below with examples.

3. Assisting Financial Institutions in Debt Collection

Figure 2:
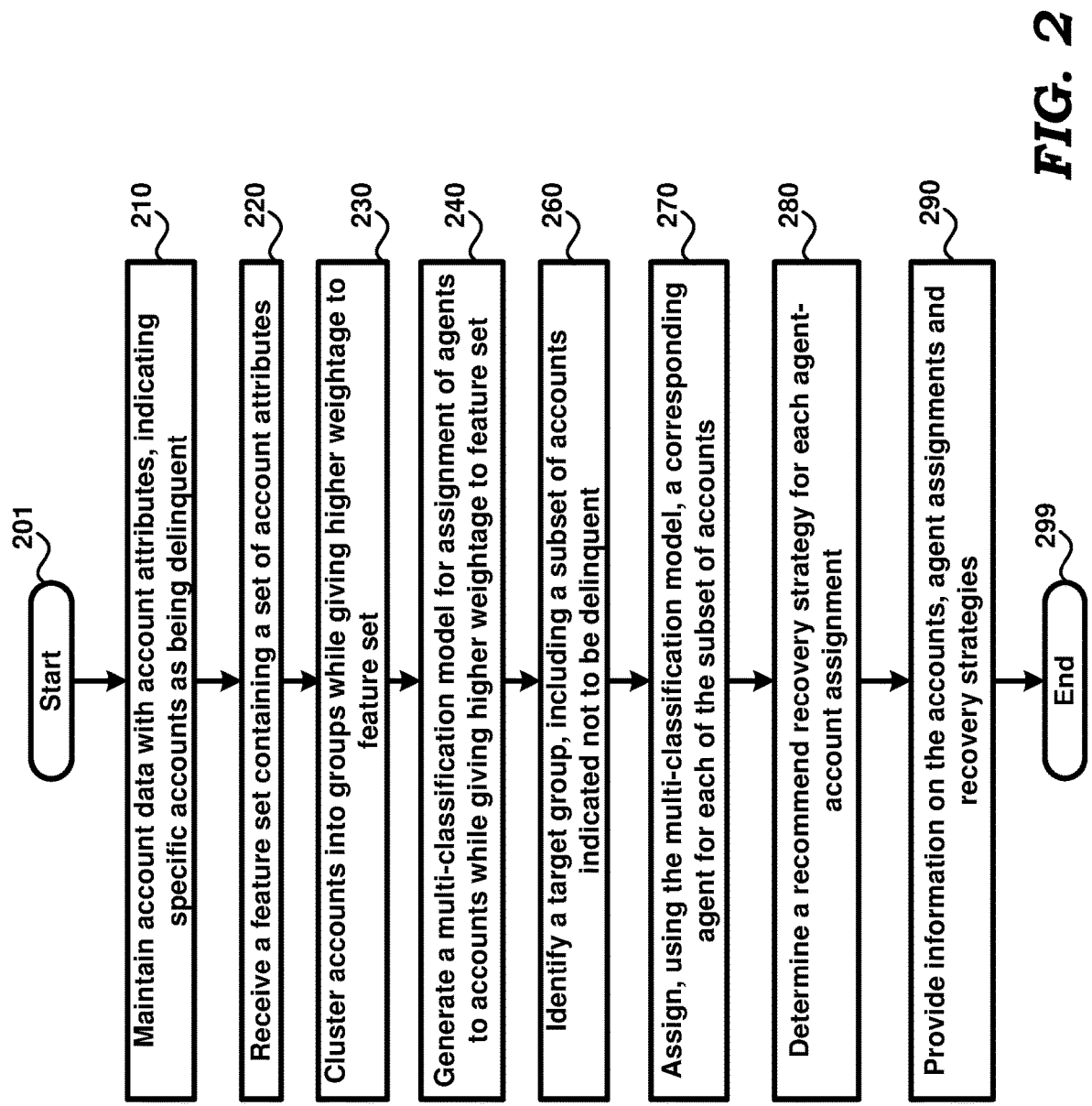
FIG. 2 is a flow chart illustrating the manner in which a technology system assists financial institutions in debt collection according to aspects of the present disclosure.

FIG. 2 is a flow chart illustrating the manner in which a technology system (150) assists financial institutions in debt collection according to aspects of the present disclosure. The flowchart is described with respect to the systems of FIG. 1, in particular DCM 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, DCM 150 maintains account data with account attributes, indicating specific accounts as being delinquent. Each account attribute has an attribute identifier (describing the corresponding attribute) and an attribute value characterizing the account of a corresponding customer. Examples of such account attributes include location, city, the total due amount, outstanding due amount, collateral type, prior payments, etc.

In the description herein, the terms account and customer are used interchangeably assuming a one-to-one relationship. One or more of the account attributes may together indicate that some of the specific accounts are already delinquent. The account data may be maintained in data store 180 or any non-volatile storage associated with DCM 150.

In step 220, DCM 150 receives a feature set containing a set of account attributes, for example, from a user such as an administrator using one of end-user systems 110. As will be clear from the description, the feature set represents account attributes that are to be given higher weightage, compared to other account attributes during further processing of the account data.

In step 230, DCM 150 clusters accounts into groups while giving higher weightage to feature set. In general, clustering entails including in each group, one or more accounts that are similar to each other at least in the attribute values of the account attributes. However, the account attributes specified as part of the feature set are given higher weightage, implying that accounts with the same/close value for attributes of feature set are put together is the same group, while accounts that have distant/different attribute values are put in different groups, irrespective of similarity or dissimilarity of attribute values for attributes not contained in the feature set.

In an embodiment, each group is associated with one or more group qualifiers that qualifies the accounts in that group. Each group qualifier specifies a corresponding range of attribute values for respective attributes of the accounts contained in that group. In the examples described herein, it is assumed that the group qualifiers have one-to-one relationship with the account attributes. However, in alternative embodiments, any convenient set of account attributes together may be chosen as group qualifiers.

In step 240, DCM 150 generates a multi-classification model for assignment of (recovery) agents to (customer) accounts while giving higher weightage to feature set compared to those account attributes not contained in the feature set. The model may be generated based on a set of recovery attributes of each agent and the group qualifiers of all the groups determined in step 230. The recovery attributes of an agent indicate the details of the agents such as location, city, etc. and/or details of accounts previously handled by the agent such as due amounts handled, collateral types handled, success/failure (or a percentage thereof) of payments, etc.

As is well known, a multi-classification model is designed for assigning the items contained in multiple classes (here, agents and accounts), with the assumption that such assignment is one-to-one (one agent to one account). In an embodiment, the inputs provided to DCM 150 include specific assigned weights to each account attribute, and a relatively higher number is specified for the account attributes of the feature set. The multi-classification model takes such different assigned weights into consideration in a known way.

In step 260, DCM 150 identifies a target group (from the clustered groups) likely to present problems with debt recovery. The target group contains both delinquent accounts and non-delinquent accounts as indicated by the account data. A group is identified as a target group when such group has a material number of delinquent accounts, indicative that other accounts in the same group have the potential of becoming delinquent, and therefore likely to present problems with debt recovery. As a simple example, if there are a large number of accounts (above a predetermined threshold) in a group indicated to be already delinquent, such a group may be identified as a target group. Alternatively, a group may be identified as a target group if recently turned delinquent accounts have a same data point (e.g., employer or industry segment) that would indicate that more non-delinquent accounts with the same data point are likely to turn delinquent in the group.

In step 270, DCM 150 assigns using the multi-classification model, a corresponding agent for each non-delinquent account in the target group. In particular, the multi-classification model operates to match the account attributes with the recovery attributes of the agents to determine the one-one-one assignment.

In step 280, DCM 150 determines a recommend recovery strategy for each agent-account assignment. The recommended recovery strategy may be determined based on historical data that captures the various agent-customer interactions. Each such recommended strategy is determined to maximize the reward to the agent when interacting with the customer of the assigned accounts. Examples of recovery strategies may include but are not limited to text messages (e.g., Short Message Service (SMS), instant messaging), email, call on mobile, call to office, personal visit, legal action, etc.

In step 290, DCM 150 provides the details of the accounts in the target group, the corresponding agent assigned to each account and the recommended recovery strategy for each assignment. The details may be provided to the user from whom the feature set was received in step 220. The details may be provided in any convenient manner, for example, displaying on a user interface shown on a display unit (not shown) associated with one of end-user systems 110, as an email communication to the agent, etc. Control passes to step 299, where the flowchart ends.

Thus, by providing a target group of accounts likely to present problems with recovery, the agents assigned to the account and corresponding recovery strategy for each assignment, DCM 150 assists financial institutions in debt collection. It may be appreciated that the above noted steps of 260, 270, 280 and 290 may be performed iteratively to identify and provide details of multiple target groups likely to present problems with recovery, thereby further simplifying the tasks of debt collection for financial institutions.

The manner in which DCM 150 is implemented to provide several aspects of the present disclosure according to the steps of FIG. 2 is illustrated below with examples.

4. Debt Collection Manager

Figure 3:
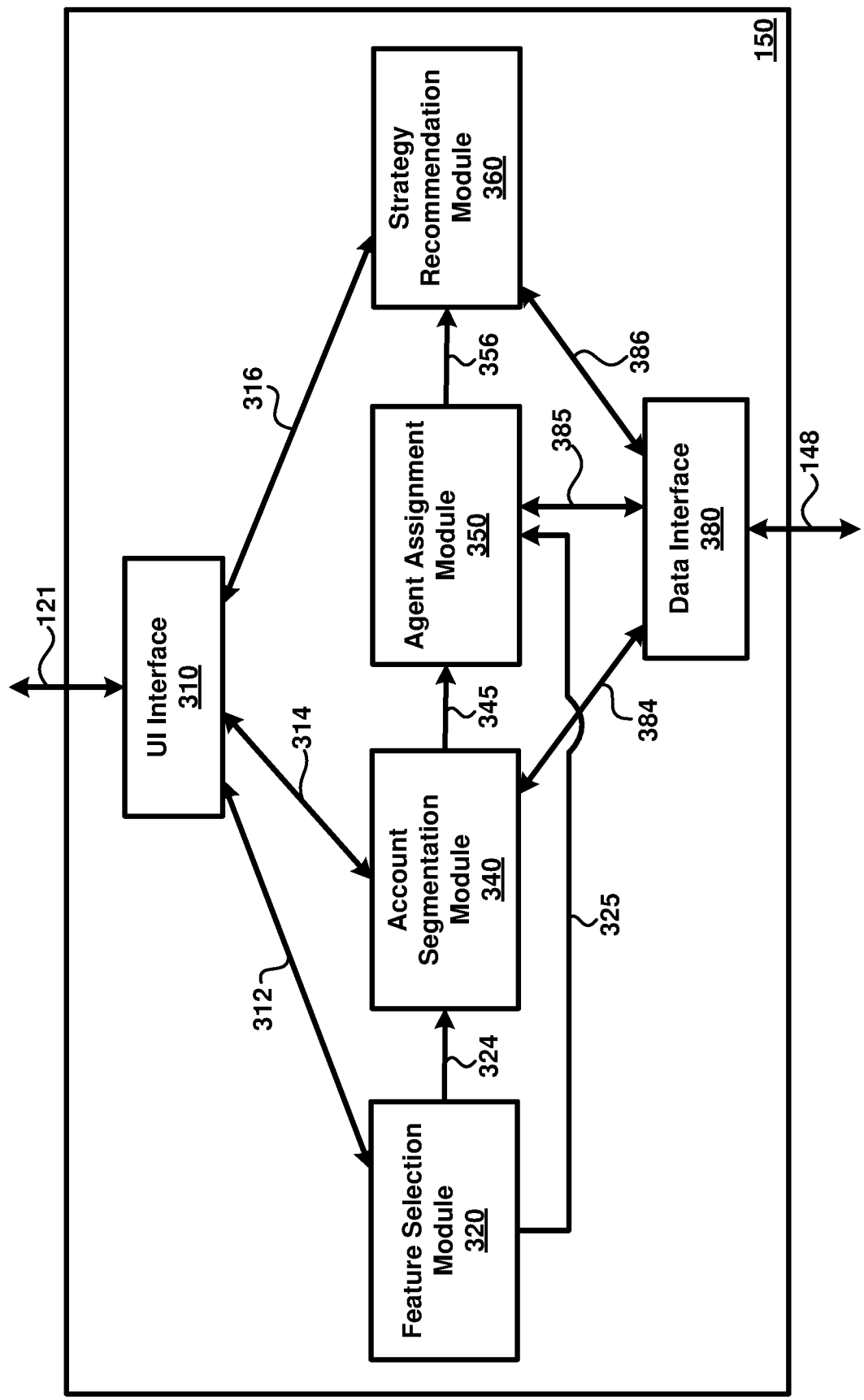
FIG. 3 is a block diagram of a debt collection manager according to several aspects of the present disclosure.

FIG. 3 is a block diagram of a debt collection manager (150) according to several aspects of the present disclosure. The block diagram is shown containing user interface (UI) interface 310, feature selection module 320, account segmentation module 340, agent assignment module 350, strategy recommendation module 360 and data interface 380. Each of the blocks in the Figure is described in detail below.

UI interface 310 facilitates other modules of DCM 150 to interact with users (such as customers of the financial institution, administrators, etc.) using end-user systems 110. UI interface 310 receives data from a specific module, provides the received data in the form of one or more user interfaces (e.g., web pages) to end-user systems 110, receives the inputs provided by the users from the end-user systems 110, and forwards the received inputs to the specific module.

Data interface 380 facilitates other modules of DCM 150 to communicate with external data stores (such as data store 180) for storage and retrieval of appropriate data. Data interface 380 receives queries from a specific module, forwards the queries to data store 180, receives the results of execution of the queries from data store 180, and forwards the received results to the specific module. It may be appreciated that data interface 380 may also modify the queries and/or results based on the interface requirements of the external data store (180).

Feature selection module 320 interacts with users/administrators to obtain the feature set (set of account attributes) of interest to the users based on which clustering of accounts and assignment of agents to accounts is to be performed. Specifically, feature selection module 320 sends via path 312 a request for the feature set to UI interface 310, which in turn causes one or more user interfaces (e.g., FIGS. 4A-4B) to be provided to administrators, and receives (via path 312) the feature set selected by an administrator as a response to the request. Feature selection module 320 then forwards the received feature set to account segmentation module 340 via path 324 and also to agent assignment module 350 via path 325.

Account segmentation module 340 receives the feature set via path 324 and also retrieves the details of the account data (e.g., FIG. 6A) maintained in data store 180 using data interface 380. Account segmentation module 340 then performs the clustering of the accounts into one or more groups (also referred to as "clusters") based on the account attributes while giving higher importance to the account attributes specified in the feature set. Account segmentation module 340 stores the details of the clustered groups (e.g., FIGS. 6B-6C) in data store 180 using data interface 380 via path 384.

Account segmentation module 340 also identifies one or more target groups (from the clustered groups) that are likely to present problems with debt collection. In one embodiment, the account data includes a corresponding delinquency status for each account indicating whether the account is already delinquent, not delinquent, a number of payments missed, etc. As such, the target group may be identified based on the number and/or contribution of the delinquent accounts to the delinquency of the other non-delinquent accounts in the group. As such, a target group may be viewed as containing delinquent and possibly delinquent accounts.

In one embodiment, account segmentation module 340 also facilitates users/administrators to view the details of the clustered groups using one or more user interfaces (e.g., FIGS. 7A-7E). It may be appreciated that in other embodiments not shown, an administrator may be enabled (using appropriate user interfaces not shown) to pick/select one or more of the clustered groups as being the target groups of interest. Account segmentation module 340 then forwards the details of all the clustered groups and also the target groups to agent assignment module 350 via path 345.

Agent assignment module 350 receives the feature set via path 324, the clustered groups and target groups identified by account segmentation module 340 via path 345 and also retrieves the details of the agent data (e.g., FIG. 9A) maintained in data store 180 using data interface 380. Agent assignment module 350 then generates a multi-classification model based on recovery attributes of the agent and the group qualifiers associated with the received groups/clusters, while giving higher importance to the account attributes specified in the received feature set.

Agent assignment module 350 then uses the generated multi-classification model to assign a corresponding agent to each account in each target group. In particular, agent assignment module 350 picks a target group and then assigns using the multi-classification model a corresponding agent to each non-delinquent/possibly delinquent account in that target group. Agent assignment module 350 may assign a corresponding agent to each delinquent account in that target group as well. Agent assignment module 350 may then perform the above noted steps iteratively for all the target group received from account segmentation module 340.

According to an aspect, such assignment is performed only for the target groups identified by account segmentation module 340. However, in alternative embodiments, such agent-account assignment may be performed for the accounts in all the identified groups/clusters. Agent assignment module 350 stores the details of the assignments (e.g., FIG. 9B) in data store 180 using data interface 380 via path 385, and then forwards the details of the assignments to strategy recommendation module 360 via path 356.

Strategy recommendation module 360 receives the assignments via path 356 and also retrieves the details of the strategies (e.g., FIG. 11A) maintained in data store 180 using data interface 380 via path 386. Strategy recommendation module 360 then determines a recommended strategy for each of the received assignments based on historical data that captures the various agent-customer interactions (e.g., FIG. 11B). According to an aspect, such determination is performed only for the assignments performed for the target groups identified by account segmentation module 340. Strategy recommendation module 360 then provides users/administrators the details of the target groups, the corresponding assignments for each target group and the recommended strategy for each assignment using one or more user interfaces (e.g., FIG. 12).

Thus, DCM 150 is implemented to assist financial institutions in debt collection. According to several aspects of the present disclosure, each of account segmentation module 340, agent assignment module 350 and strategy recommendation module 360 is implemented using artificial intelligence (AI) techniques such as machine learning (ML) and reinforcement learning. As such, DCM 150 may be viewed as being operated in two stages—a training stage and a prediction (usage) stage. In the training stage, DCM 150 uses historical data to train respective ML/RL based models. The training of each ML/RL model is based on the large volumes of historical data (including customer account data, recovery agent data and recovery strategy data) available in data store 180. In the prediction stage, DCM 150 utilizes the trained models to identify potentially or actually delinquent accounts/customers, assign suitable recovery agents for the identified customers and recommend the assigned recovery agent with an appropriate strategy.

The manner in which the various modules of FIG. 3 may be implemented using AI techniques and operate together to assist financial institutions in debt collection is described below with examples.

5. Illustrative Operation

FIGS. 4A-4B, 5, 6A-6C, 7A-7E, 8, 9A-9B, 10, 11A-11B and 12 together illustrate the manner in which DCM 150 assists financial institutions in debt collection in one embodiment. Each of the Figures is described in detail below.

Figure 4A:
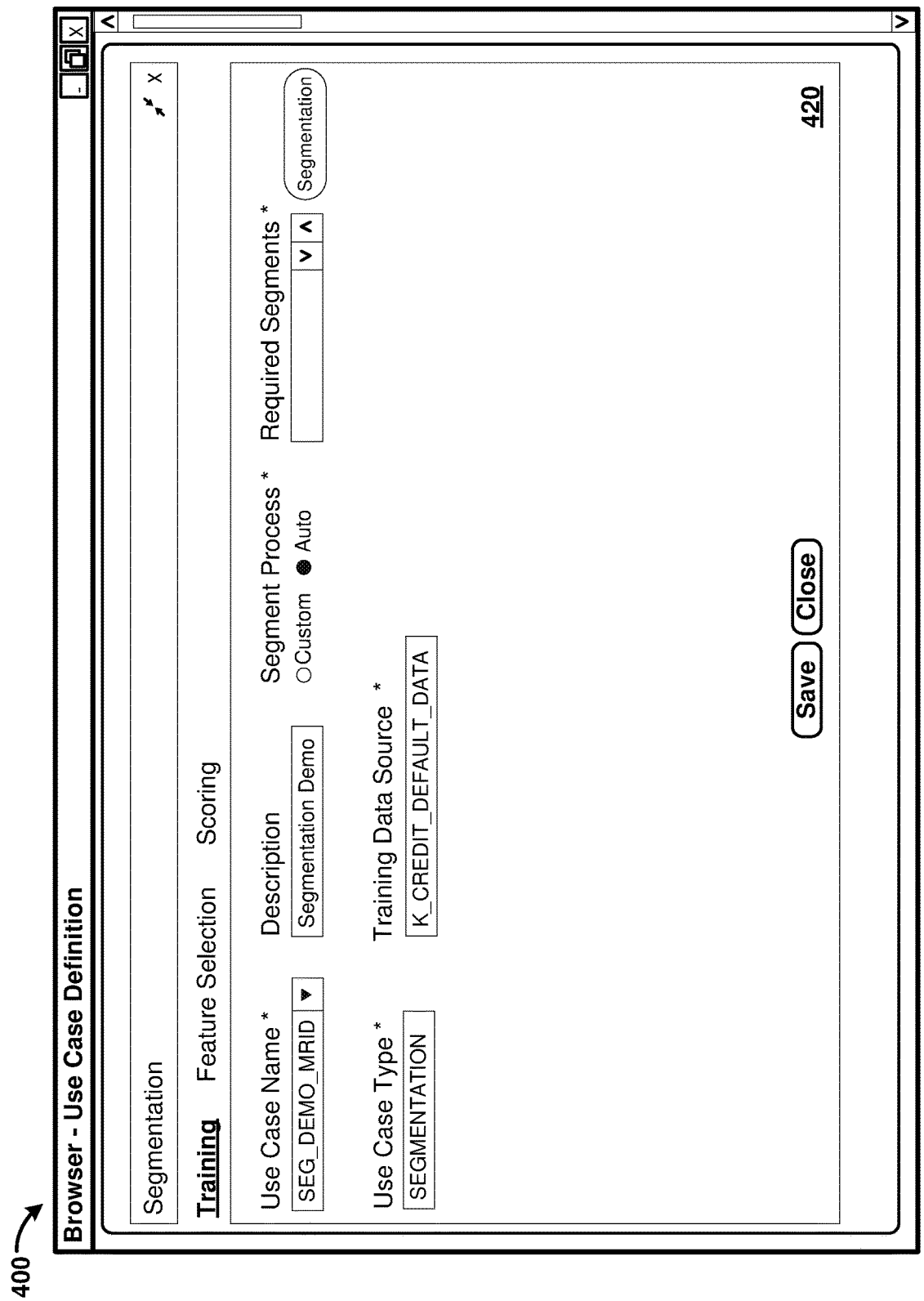
FIGS. 4A-4B depict various user interfaces provided to a user/administrator for selecting a desired feature set in one embodiment.
Figure 4B:
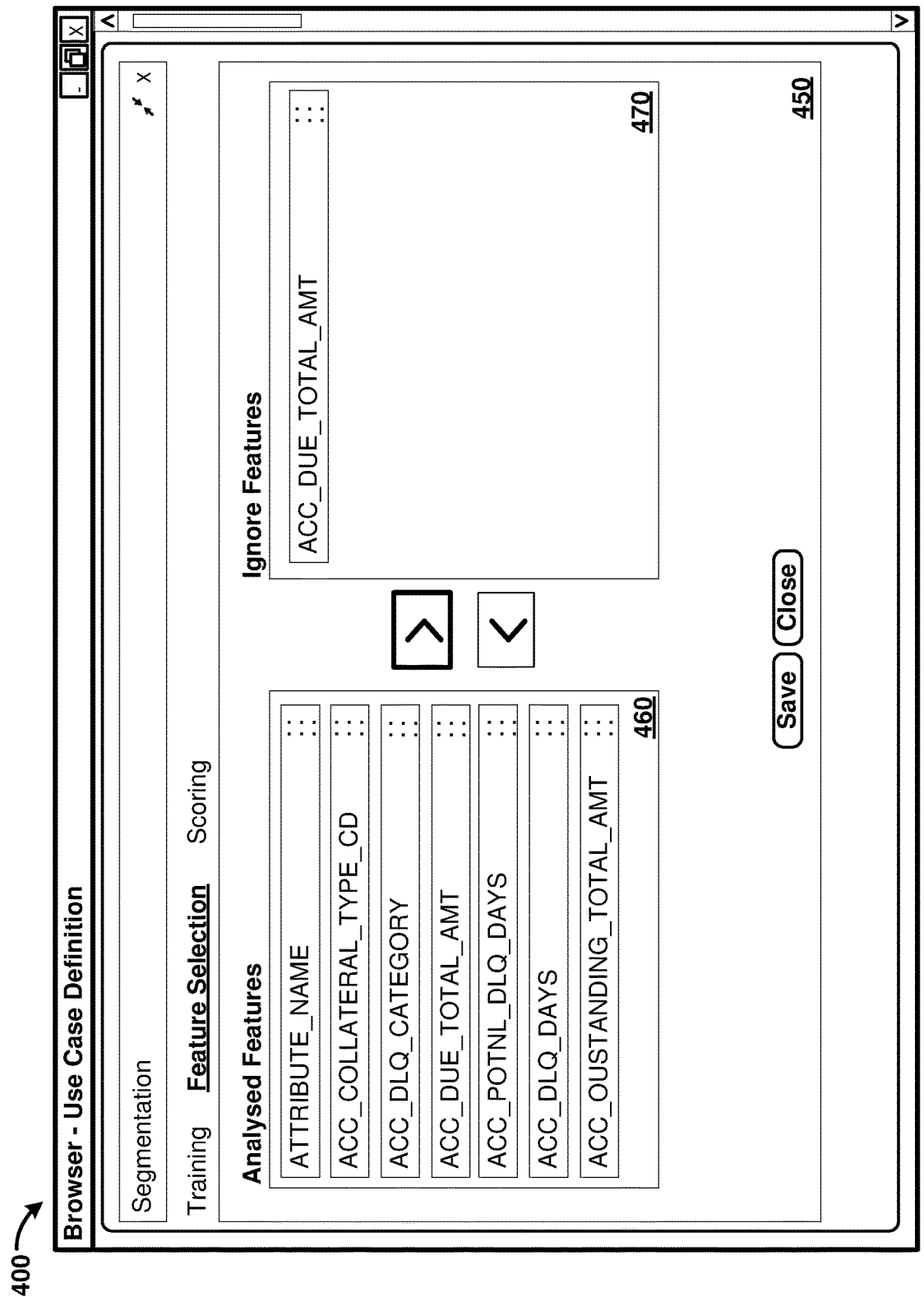

FIGS. 4A-4B depict various user interfaces provided to a user/administrator for selecting a desired feature set in one embodiment. Display area 400 (and also 700 of FIGS. 7A-7E and 1200 of FIG. 12) represents a portion of a user interface displayed on a display unit (not shown) associated with one of end-user systems 110. In one embodiment, display area 400 corresponds to a web page rendered by a browser executing on the end-user system. Web pages are provided by DCM 150 in response to a user sending appropriate requests (for example, by specifying corresponding URLs in the address bar) using the browser.

Referring to FIG. 4A, display area 420 enables a user/administrator to specify the details of a use case for training the ML/RL models in DCM 150. The field "Use Case Name" is used to specify a unique name for trained models, and overwrites any older model if a model already exists with the same name. The field "Description" is an optional free text field where users can specify details about the use case. The field "Segment Process" has two options—custom and auto. A user can select the "custom" option to specify how many (the number of) clusters/groups to be created by the ML model (in the "Required Segments" field). The user can select the "auto" option to indicate that the ML model can automatically devise the number of clusters as per the data distribution.

The field "Use Case Type" enables the user to specify the type of the use case, with the value "SEGMENTATION" indicating that the use case is related to clustering. Other values for use case type may indicate use cases for classification, etc. The field "Training Data Source" enables the user to specify the specific data store/database from which the various data (account data, agent data, strategy data, etc.) are to be retrieved and used for the creation and usage of the ML/RL models. A user may specify the desired details in the various fields of display area 410 and select the "Save" button to proceed with selecting a desired feature set as explained in detail below.

Referring to FIG. 4B, display area 450 enables a user/administrator to specify a desired feature set for analysis (the steps of FIG. 2). In particular, display area 460 ("Analyzed Features") shows a list of features/account attributes available for selection, and based on which the analysis will be performed by DCM 150. A user may select, drag and drop attributes/features from display area 460 to display area 470 ("Ignore Features") indicating that the selected attribute/feature is not to be used for analysis by DCM 150. After specifying the desired feature set in display area 460, the user/administrator may select "Save" button to send a request to DCM 150 containing the selected feature set (shown in display area 460) to DCM 150.

DCM 150, in particular, feature selection module 320, receives the feature set (containing one or more account attributes) from the user and forwards the selected feature set to account segmentation module 340 via path 324 and to agent assignment module 350 via path 325. The manner in which account segmentation module 340 process the selected feature set is described below with examples.

6. Account Segmentation Module

Figure 5:
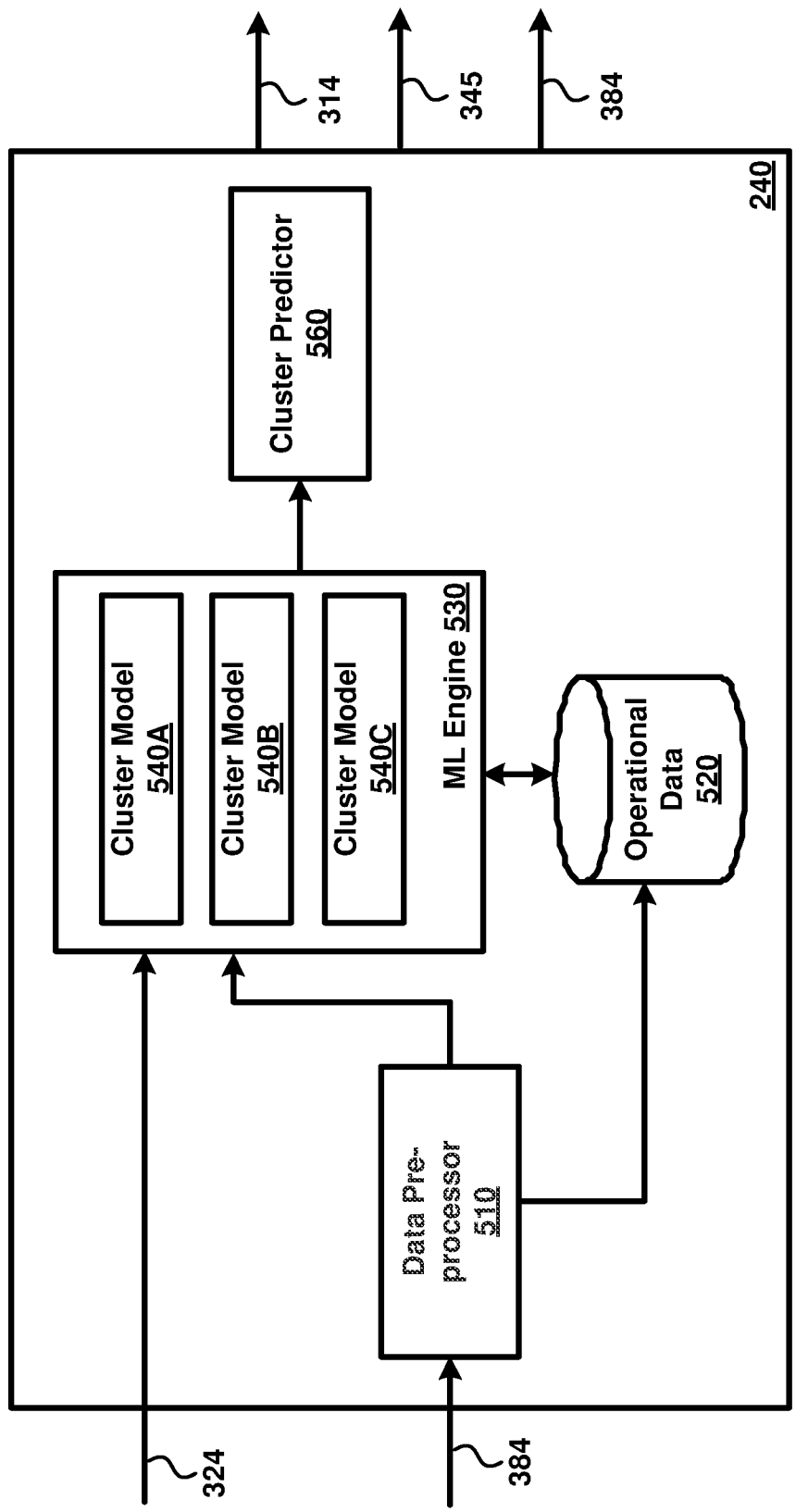
FIG. 5 is a block diagram depicting an implementation of an account segmentation module in one embodiment.

FIG. 5 is a block diagram depicting an implementation of an account segmentation module (340) in one embodiment. The block diagram is shown containing data pre-processor 510, operational data store (ODS) 520, ML engine 530 (in turn, shown containing cluster models 540A-540C) and cluster predictor 560. Each of the blocks is described in detail below.

Data pre-processor 510 retrieves the account data from data store 180 by interfacing with data interface 180 via path 384 and pre-processes (data loading, cleaning and preparation) the data for use in the training stage. Pre-processing includes but is not limited to removing incorrect/incomplete data, discretization of data, normalization of data, etc. as is well known in the relevant arts. Data pre-processor 510 stores the pre-processed data in ODS 520 and also forwards the pre-processed data to ML engine 530.

ODS 520 represents a data store that maintains portions of operation data used by ML engine 530. Though shown internal to account segmentation module 340, in alternative embodiments, ODS 520 may be implemented external to account segmentation module 340, for example, as part of data store 180 as will be apparent to one skilled in the relevant arts by reading the disclosure herein.

ML engine 530 generates various models that correlate the data received from data pre-processor 510. The models may be generated using any clustering machine learning approach. In one embodiment, ML engine 530 employs one or more of K-Means, O-Cluster and Expectation maximization algorithms for generating the models. Various other clustering machine learning approaches may be employed, as will be apparent to skilled practitioners, by reading the disclosure provided herein. In an embodiment, supervised clustering machine learning approaches are employed for generation of the models.

The specific clustering approach to be used may be determined based on whether an input specifying a desired number of clusters has been received or not, and based on the characteristics/volume of historical data. For example, when a certain number of clusters is desired to be output, K-Means clustering technique may be selected. Alternatively, when such an input is not received, and when the accounts data contains nested column attributes, expectation maximization technique may be selected. When an input is not received, and when accounts data does not contain nested column attributes, O-Cluster technique may be selected.

According to an aspect, ML engine 530 generates the models while giving higher importance to the account attributes in the feature set selected by a user/administrator (received via path 324 from feature selection module 320). Such higher importance to specific account attributes can be incorporated in to the clustering machine learning approaches in a known way.

Cluster models 540A-540C represent ML based models generated for different use cases specified by a user using the user interfaces of 4A-4C. Each cluster model co-relates the attribute values of the various account attributes (specified in the feature set) contained in the pre-processed account data received from data pre-processor 510. Each cluster model operates to group the various accounts into one or more groups/clusters based on the attribute values. For example, regular-paying customers/accounts may be clustered into a 'no action required' cluster whereas customers/accounts who have missed only a single payment may be clustered into a 'low-risk' cluster. Any of cluster models 540A-540C may be used to predict the various groups/clusters.

Cluster predictor 560 determines/predicts the various groups/clusters of accounts by using one of cluster models 540A-540B during the prediction stage. Cluster predictor 560 also identifies the specific groups that are likely to present problems with debt collection based on the corresponding delinquency status of the accounts contained in each group. According to an aspect, cluster predictor 560 calculates a probability of delinquency for each group based on weights associated with the corresponding delinquency statuses of the accounts contained in that group. In one embodiment, the probability of delinquency is calculated as the ratio of the number of accounts in the group that have already defaulted/delinquent versus the total number of accounts present in the group.

In addition, cluster predictor 560 also forms cluster rules that determine the accounts in each cluster. Cluster rules represent decision boundaries of each cluster/group implying that the accounts lying in this group lie within these boundaries. These are calculated with standard decision boundaries calculations and are specific to the algorithm used for determining the clusters/groups.

Cluster predictor 560 then stores the details of the predicted/determined groups/clusters in data store 180 (by interfacing with data interface 380) via path 384 and forwards the groups/clusters information to agent assignment module 350 via path 345. Some sample data maintained in data store 180 by account segmentation module 340 is described in detail below.

FIG. 6A is an account table (610) depicting the details of customers/accounts of a financial institution in one embodiment. Though shown in the form of a table, the data (and other data of FIGS. 6B-6C, 9A-9B and 11A-11B) may be collected/maintained according to other data formats (such as extensible markup language (XML), etc.) and/or using other data structures (such as lists, trees, etc.), as will be apparent to one skilled in the relevant arts by reading the disclosure herein.

In account table 610, each row specifies the details of a corresponding customer/account. The columns indicate the various (account) attribute identifiers such as Account_Id, Acc_Details, Acc_Loan_Amt, Acc_Dlq_Category, etc. while the corresponding (account) attribute values are specified in the rows. It should be noted that the values in column Aco_Acc_Condition_Cd indicates whether the corresponding account/customer is delinquent (value "DELQ"), not delinquent (value "NDELQ"), bankruptcy (value "BKRP"), etc. For example, row 613 indicates the details of an account having the respective account attribute values of "A1003", "Vinay Kumar", "600000", "D", etc. for the corresponding account attribute identifiers Account_Id, Acc_Details, Acc_Loan_Amt, Acc_Dlq_Category, etc. Similarly, the other rows in account table 610 specify the details of other accounts/customers.

FIG. 6B is a cluster table (620) specifying the details of the groups/clusters determined for accounts based on a feature set provided by a user in one embodiment. In cluster table 620, each row specifies the details of a corresponding group. The column "Cluster Id" specifies a unique identifier associated with the group/cluster. The other columns in cluster table 620 represent the group qualifiers that qualify/specify the details of the corresponding group. It may be noted that some of the group qualifiers are specified as a range of values in the format '[minimum value; maximum value]'. For example, row 622 indicates that for the group/cluster C2 (value in column "Cluster Id"), the range of values for the column/group qualifier "ACC_DLQ_DAYS" (account delinquent days) is between 0 and 80.9.

It may be appreciated that the minimum value and maximum value specified in the columns of cluster table 620 represent decision boundaries of each corresponding cluster/group implying that the accounts lying in that group lie within those boundaries. Thus, the various group qualifiers in columns ACC_DLQ_DAYS, ACC_DUE_TOTAL_AMOUNT, etc. in a row specifying a group may be viewed as cluster rules that define the accounts contained in that group. The determination of whether an account is a member of a group may be performed by determining whether the account details shown in each of rows of account table 610 are within the boundaries defined by the cluster rules in cluster table 620.

FIG. 6C is a segmentation table (630) specifying the association between the accounts and groups in one embodiment. In segmentation table 630, each row indicates an account (column "Account_Id") and a corresponding group/cluster (column "Cluster Id") to which the account belongs. In addition, for each combination of account and group in a corresponding row of table 630, column "Probability of Delinquency" indicates a probability of delinquency calculated by DCM 150 as noted above, and column "Attribute Thresholds" indicate the account details (in one embodiment, attributes/columns of table 610) that were used to determine the membership of the account in that cluster.

For example, row 651 indicates that the account A1001 is a member of cluster/group C2 based on the account attribute ACC_LOAN_AMT, ACC_COLLATERAL_TYPE_CD and ACO_ACC_CONDITION_CD. It may be observed that each account attribute is associated with a corresponding weight indicating the weightage given to the account attribute when determining the membership. Based on the different weights, the account attributes are also associated with ranks indicating the order of importance of the account attributes in determination of the membership. It may be readily appreciated that row 654 indicates a different account A1004 being part of the same cluster/group C2, but based on a different set of account attributes with corresponding weights and ranks. Row 656 indicates that account A1006 is a member of another different cluster/group C6 based on the account attributes shown in column "Attribute Threshold".

Similarly, the other rows in segmentation table 630 specifies the association between accounts and groups/clusters.

Only a sample number of account attributes are shown in column "Attribute Threshold" for conciseness. In alternative embodiments, different number of account attributes (e.g., 5) and/or different set of account attributes may be used to determine the association between accounts and groups, as will be apparent to one skilled in the relevant arts by reading the disclosure herein.

Referring again to FIG. 5, cluster predictor 560 also facilitates users/administrators to view the details of the predicted groups/clusters by interfacing with UI interface 310 via path 314. Some sample user interfaces that may be provided to users/administrators for viewing the details of the groups/clusters are described in detail below.

Figure 7A:
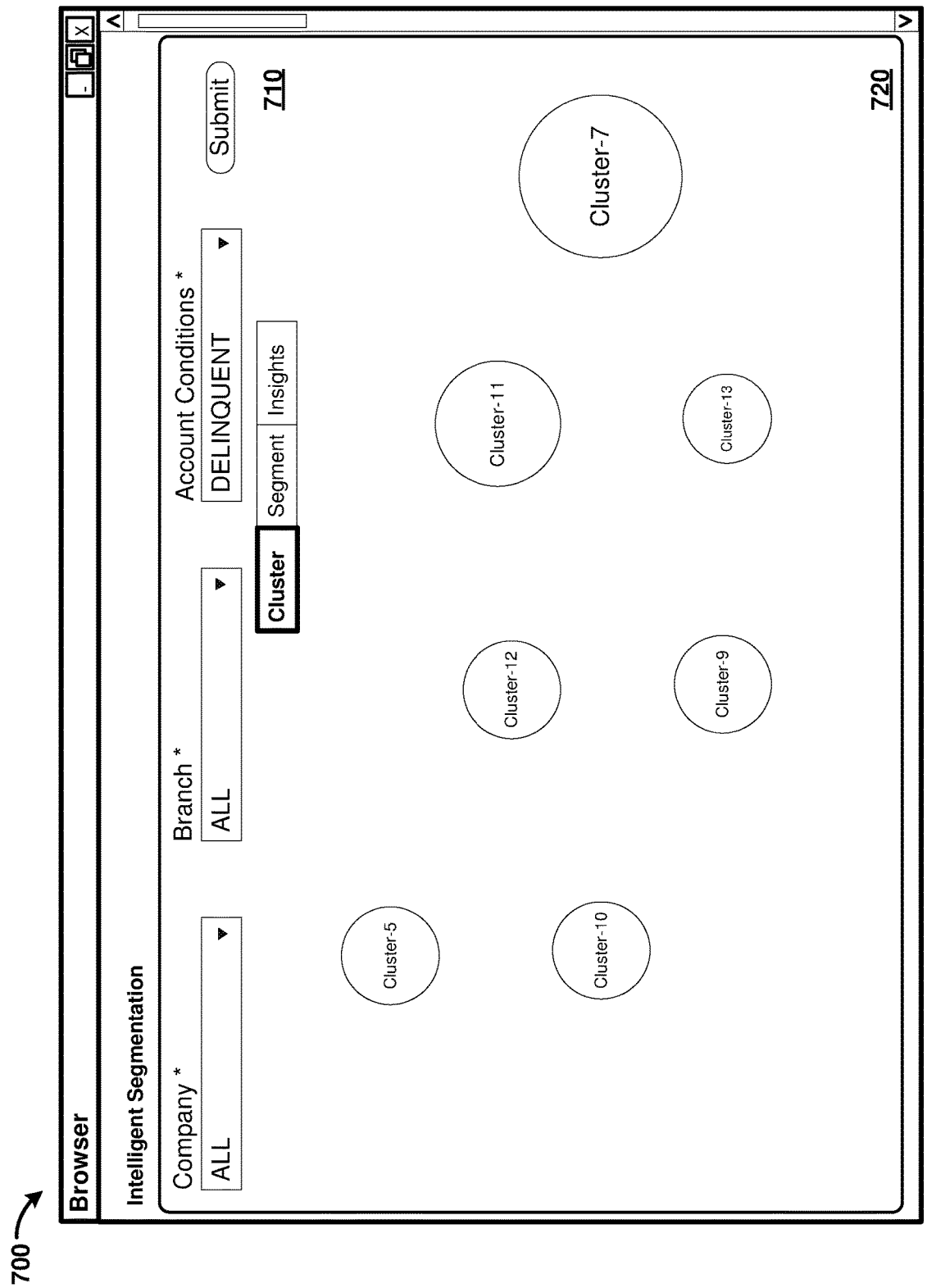

FIGS. 7A-7E depict various user interfaces provided to a user/administrator for viewing the details of the predicted groups/clusters in one embodiment. Referring to FIG. 7A, enables a user/administrator to specify desired filtering criteria such as "Company", "Branch" and "Account Conditions" and select the "Submit" button to view the groups/clusters satisfying the filtering criteria in display area 720. The groups/clusters are shown as corresponding circles with a corresponding name (generated based on the value of the "Cluster Id") indicated within the circles. It may be appreciated that a larger circle indicates a greater number of accounts in comparison to other circles.

Figure 7B:
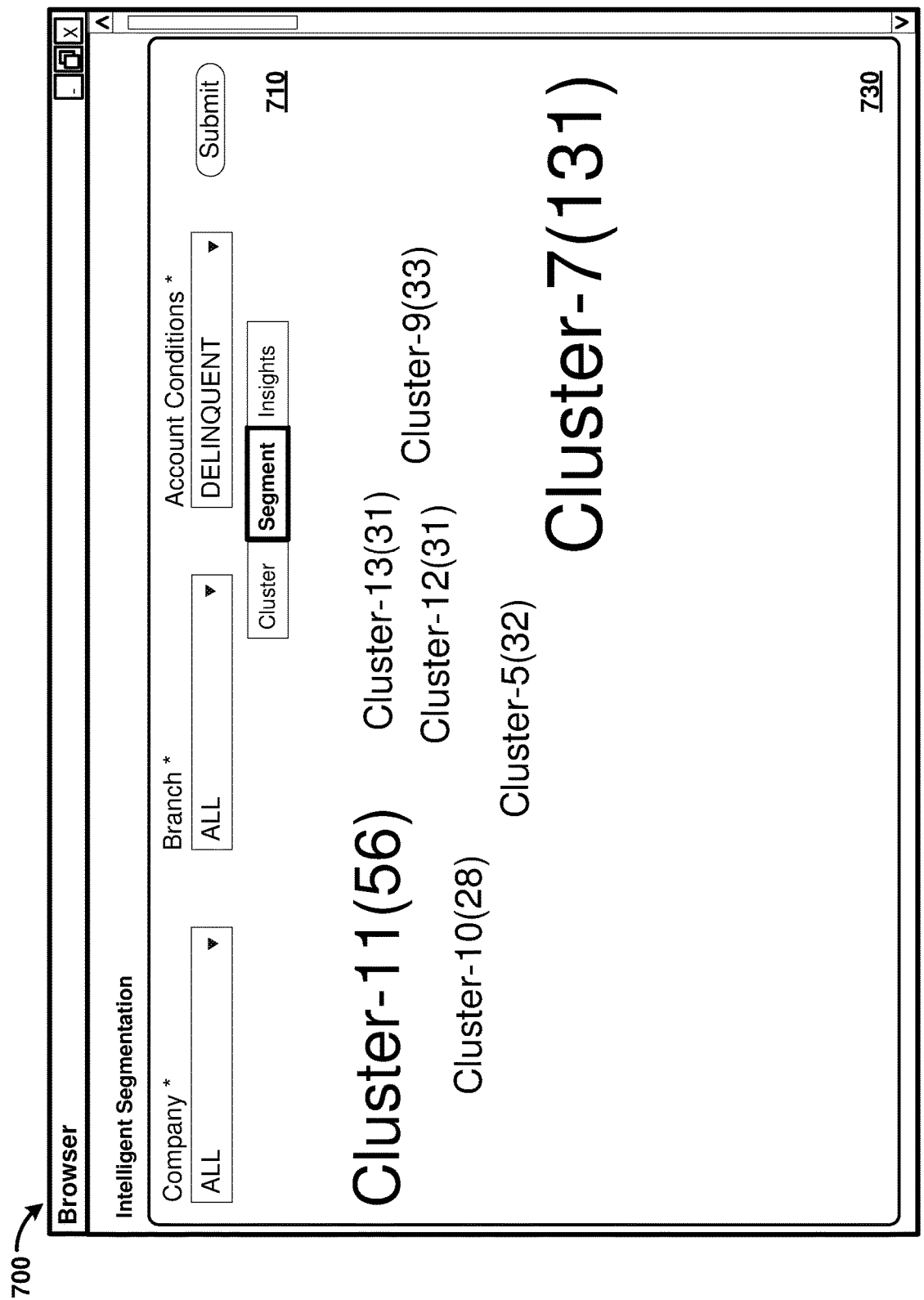

Referring to FIG. 7B, display area 730 depicts the same groups/clusters as shown in display area 720, but with the names and corresponding number of accounts contained in each group shown within brackets following the names. For example, the text "Cluster-7 (131)" indicates a cluster with the value "C7" for "Cluster Id" containing 131 accounts.

Figure 7C:
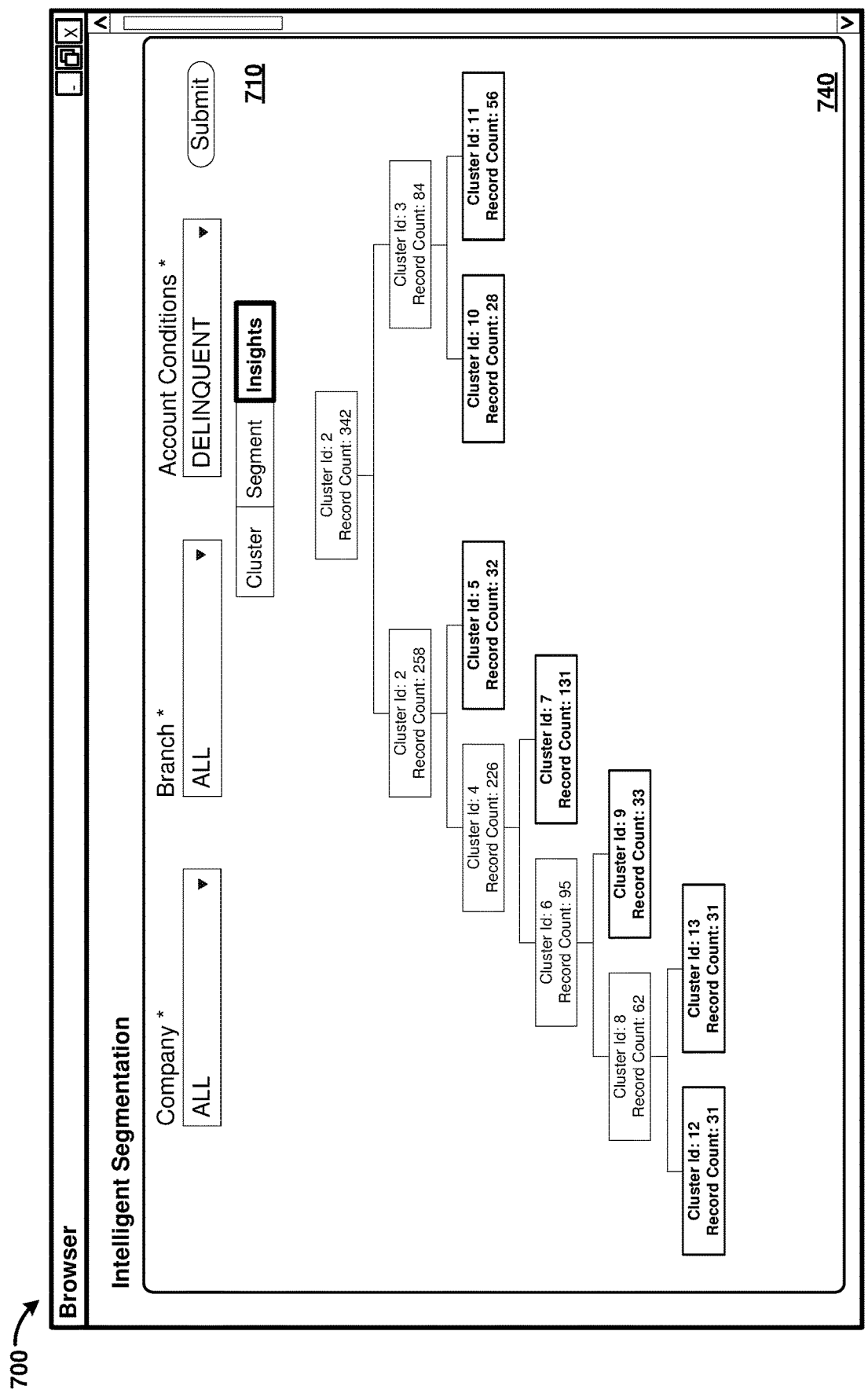

Referring to FIG. 7C, display area 740 depicts the same groups/clusters as shown in display area 720, but organized in the form of a hierarchy of nodes. Each node corresponding to a group/cluster shows the value of the "Cluster Id" for that group/cluster and a record count indicating the number of accounts in that group/cluster. It may be appreciated that the record count in each node (other than the leaf nodes) of the hierarchy is the sum of the record count of its child nodes.

Figure 7E:
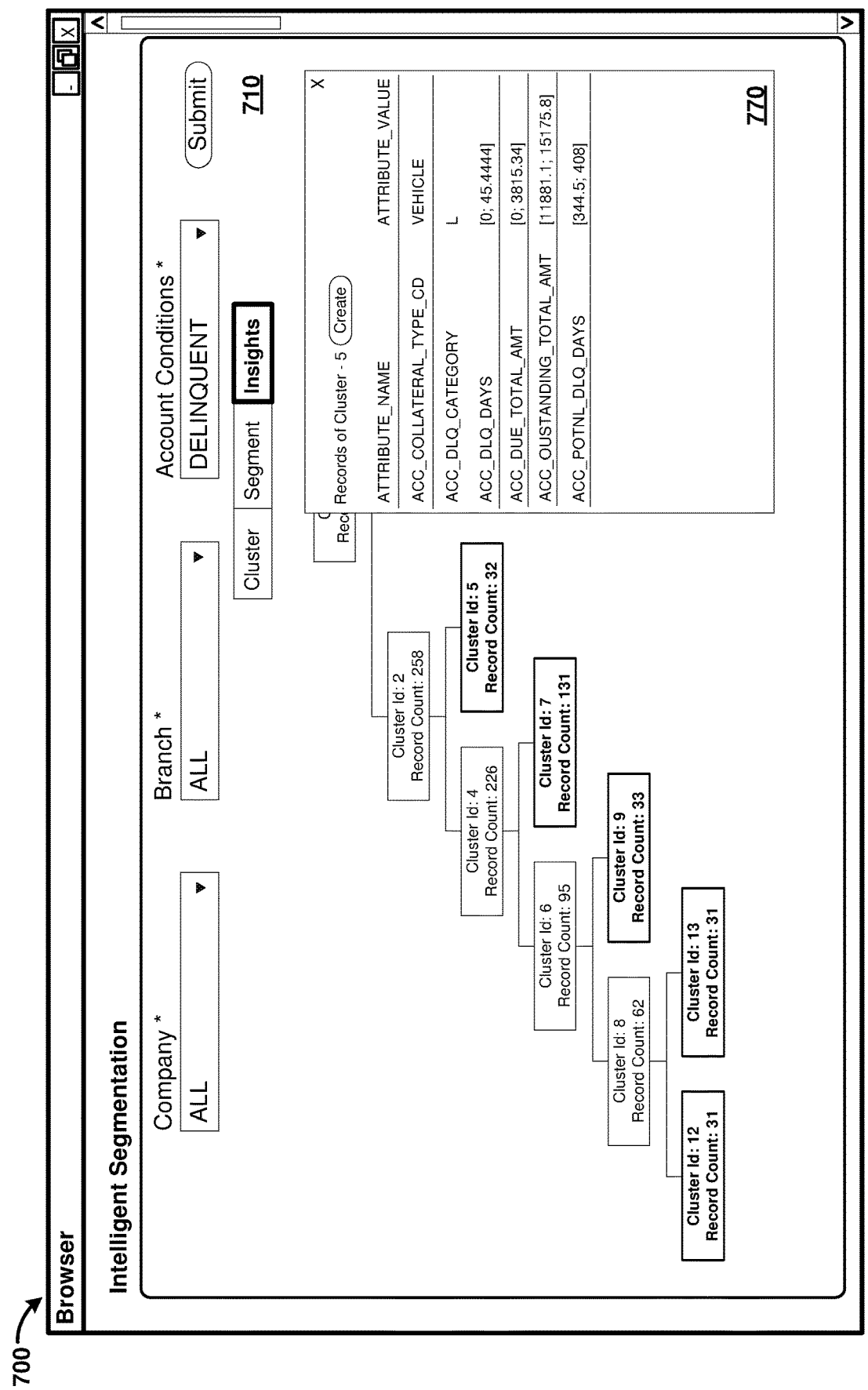

Referring to FIGS. 7D and 7E, display areas 760 and 770 respectively depicts the details of the group qualifiers for clusters "Cluster-7" and "Cluster-5" selected by a user in display area 740 of FIG. 7C. In particular, each of display areas 760 and 770 depicts the attribute identifiers corresponding to the group qualifiers and a corresponding possible set/range of attribute values for each of the group qualifiers.

Thus, account segmentation module 340 (of FIG. 3) operates to receive the feature set selected by a user/administrator, retrieve the account data and predict the different groups/clusters of accounts that are likely to cause problems with debt collection. As noted above, account segmentation module 340 forwards the groups/clusters information to agent assignment module 350, the operation of which is described below with examples.

7. Agent Assignment Module

Figure 8:
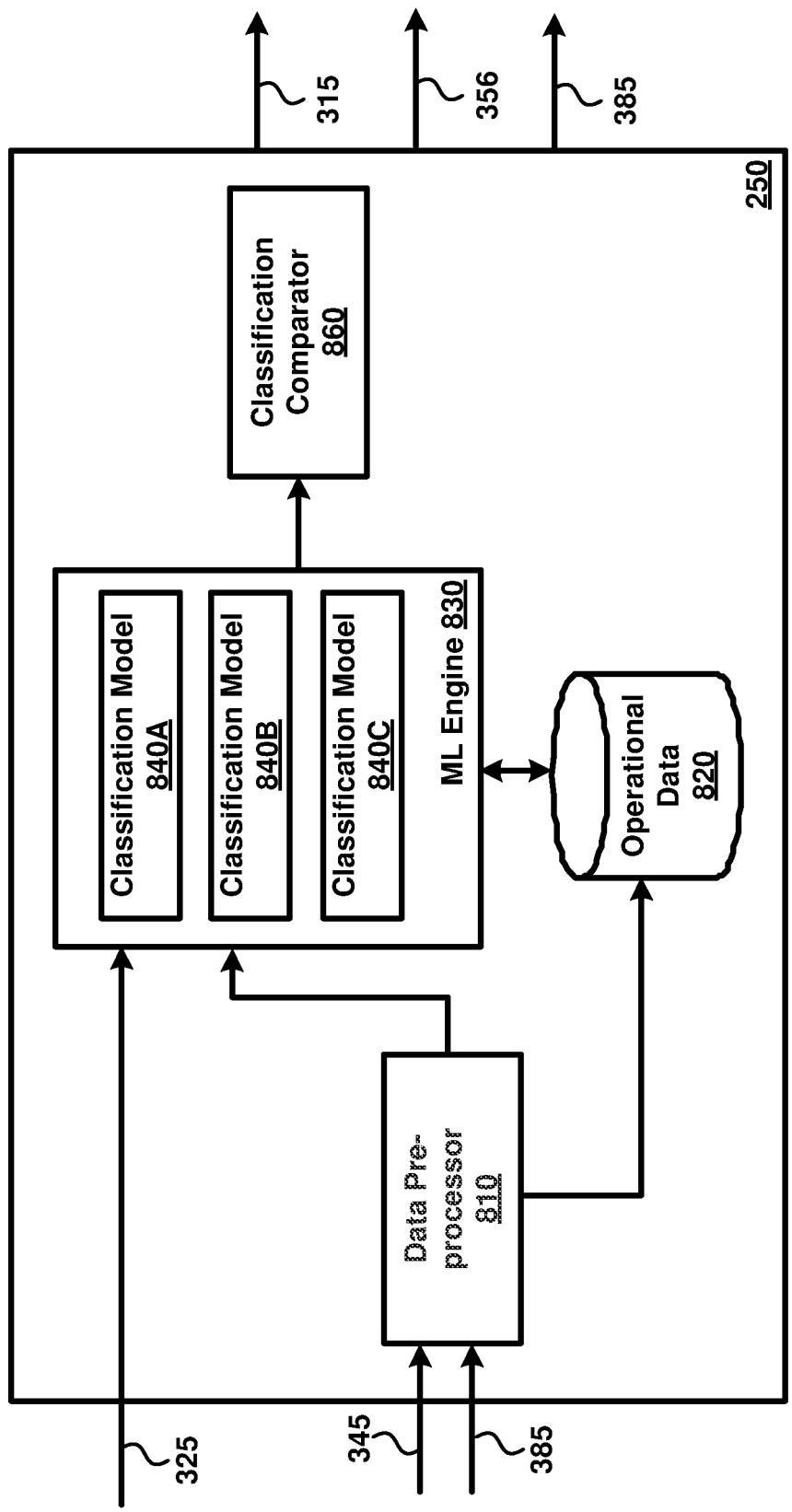
FIG. 8 is a block diagram depicting an implementation of an agent assignment module in one embodiment.

FIG. 8 is a block diagram depicting an implementation of an agent assignment module (350) in one embodiment. The block diagram is shown containing data pre-processor 810, operational data store (ODS) 820, ML engine 830 (in turn, shown containing classification models 840A-840C) and classification comparator 860. Each of the blocks is described in detail below.

Data pre-processor 810 retrieves the agent data from data store 180 by interfacing with data interface 180 via path 385 and pre-processes the data similar to the pre-processing noted above with respect to account data. Data pre-processor 810 also receives via path 345 from account segmentation module 340, the details of all the groups/clusters predicted and the specific set of target groups that are likely to present problems with debt collection. Data pre-processor 810 stores the pre-processed agent data and the groups/clusters data in ODS 820 and also forwards the data to ML engine 830.

ODS 820 represents a data store that maintains portions of operation data used by ML engine 830. Though shown internal to agent assignment module 350, in alternative embodiments, ODS 820 may be implemented external to agent assignment module 350, for example, as part of data store 180 as will be apparent to one skilled in the relevant arts by reading the disclosure herein.

ML engine 830 generates various models that correlate the data received from data pre-processor 810. The models may be generated using any classification machine learning approach. In one embodiment, ML engine 530 employs one or more of logistic regression, SVMs, ensemble trees, boosting trees, naive Bayes, KNN and shallow neural networks for generating the models. Various other classification machine learning approaches may be employed, as will be apparent to skilled practitioners, by reading the disclosure provided herein. In an embodiment, supervised classification machine learning approaches are employed for generation of the models.

According to an aspect, ML engine 830 generates the models while giving higher importance to the account attributes specified in the feature set selected by a user/administrator (received via path 325 from feature selection module 320). Such higher importance to specific account attributes (such as loan amount, delinquency days, etc.) can be incorporated in to the classification machine learning approaches in a known way. For example, a regular high-amount-paying customer may be categorized as potentially delinquent if he/she has missed payment for a few months. In this case, both features, the regular high-amount-payer and missed-few-months-payment (received from customer segmentation module 240), are important for recovery agent assignment. Thus, a recovery agent who has successfully recovered high debt amounts in the past may need to be selected for debt collection of the customer.

Classification models 840A-840C represent ML based models generated for a single use case specified by a user using the user interfaces of 4A-4C. Each classification model co-relates attribute values of the various account attributes (specified in the feature set) to the attribute values of the various agent (recovery) attributes, both contained in the pre-processed data received from data pre-processor 810. As is well known, a classification model operates to assign to each account in a group, a corresponding agent based on the co-relation between the attribute values of the account attributes and the agent/recovery attributes. According to an aspect, for each use case, multiple different classification ML models are trained based on the same input data.

Classification comparator 860 first selects a suitable ML classification model from the different classification models 840A-840C. In one embodiment, such selection is performed based on one or more of confusion matrix, accuracy, precision, recall, F1 score, ROC Curve, and gain and lift chart as is well known in the relevant arts. After selecting a suitable ML classification model as the multi-classification model to be used, classification comparator 860 uses the selected ML classification model to perform the assignment of agent to each account in each group. As noted above, in one embodiment, such assignment is performed only for the groups that have been identified as likely to present problems with debt collection.

Classification comparator 860 then stores the details of the agent-account assignments in data store 180 (by interfacing with data interface 380) via path 385 and forwards the assignment information to strategy recommendation module 360 via path 356. Some sample data processed and/or generated by agent assignment module 350 is described in detail below.

FIG. 9A is an agent table (910) specifying the details of the agents in one embodiment. In agent table 910, each row specifies the details of a corresponding agent. The columns indicate the identifiers of the agent/recovery attributes such as Agent_Id, Agent_Name, Agent_Branch, Agent_Responsibilty, etc. while the corresponding values are specified in the rows. For example, row 911 indicates the details of an agent having the respective values of "RA401", "Sam Joshi", "MH25", "Recovery Agent", etc. for the corresponding attribute identifiers Agent_Id, Agent_Name, Agent_Branch, Agent_Responsibilty, etc. Similarly, the other rows in agent table 910 specify the details of other agents.

FIG. 9B is an assignment table (920) specifying the assignments of agents to accounts in one embodiment. In assignment table 920, each row indicates an agent (column "Agent_Id") and a corresponding account (column "Account_Id") to which the agent is assigned. In addition, for each assignment of agent to an account in a corresponding row of table 920, column "Confidence Score" indicates a level of confidence (on a scale of 1-10) in the assignment (determined based on the ML model in a known way) and column "Attribute Ranking" indicates the account/agent details (in one embodiment, account attributes/columns of table 610 and agent attributes/columns of table 910) that were used to determine the assignment.

For example, row 951 indicates that the recovery agent A401 has been assigned the account/customer A1004 based on the account attribute ACC_LOAN_TYPE and the agent attributes AGENT_RESPONSIBILITY and AGENT_SKILLSET. It may be observed that each attribute is associated with a corresponding weight indicating the weightage given to the attribute when determining the assignment. Based on the different weights, the attributes are also associated with ranks indicating the order of importance of the attributes in determination of the assignment. Row 953 indicates that agent RA403 has been assigned the account A1001, but based on only agent attributes as shown in column "Attribute Ranking".

Similarly, the other rows in assignment table 620 specifies the details of other assignments between agents and accounts. Only a sample number of attributes are shown in column "Attribute Ranking" for conciseness. In alternative embodiments, different number of account and/or agent attributes (e.g., 5) and/or different set of account/agent attributes may be used to determine the assignment between agents and accounts, as will be apparent to one skilled in the relevant arts by reading the disclosure herein.

Thus, agent assignment module 350 (of FIG. 3) operates to receive the feature set selected by a user/administrator, receive the groups/clusters predicted by account segmentation module 340, retrieve the agent data and determine the different assignments of agents to accounts contained in target groups that are likely to cause problems with debt collection. It may be appreciated that irrespective of the data distribution, agent assignment module 350 may identify the most accurately fitting classification technique and thus provide an effective recovery agent assignment in all scenarios. As noted above, agent assignment module 350 forwards the assignment information to strategy recommendation module 360, the operation of which is described below with examples.

8. Strategy Recommendation Module

Figure 10:
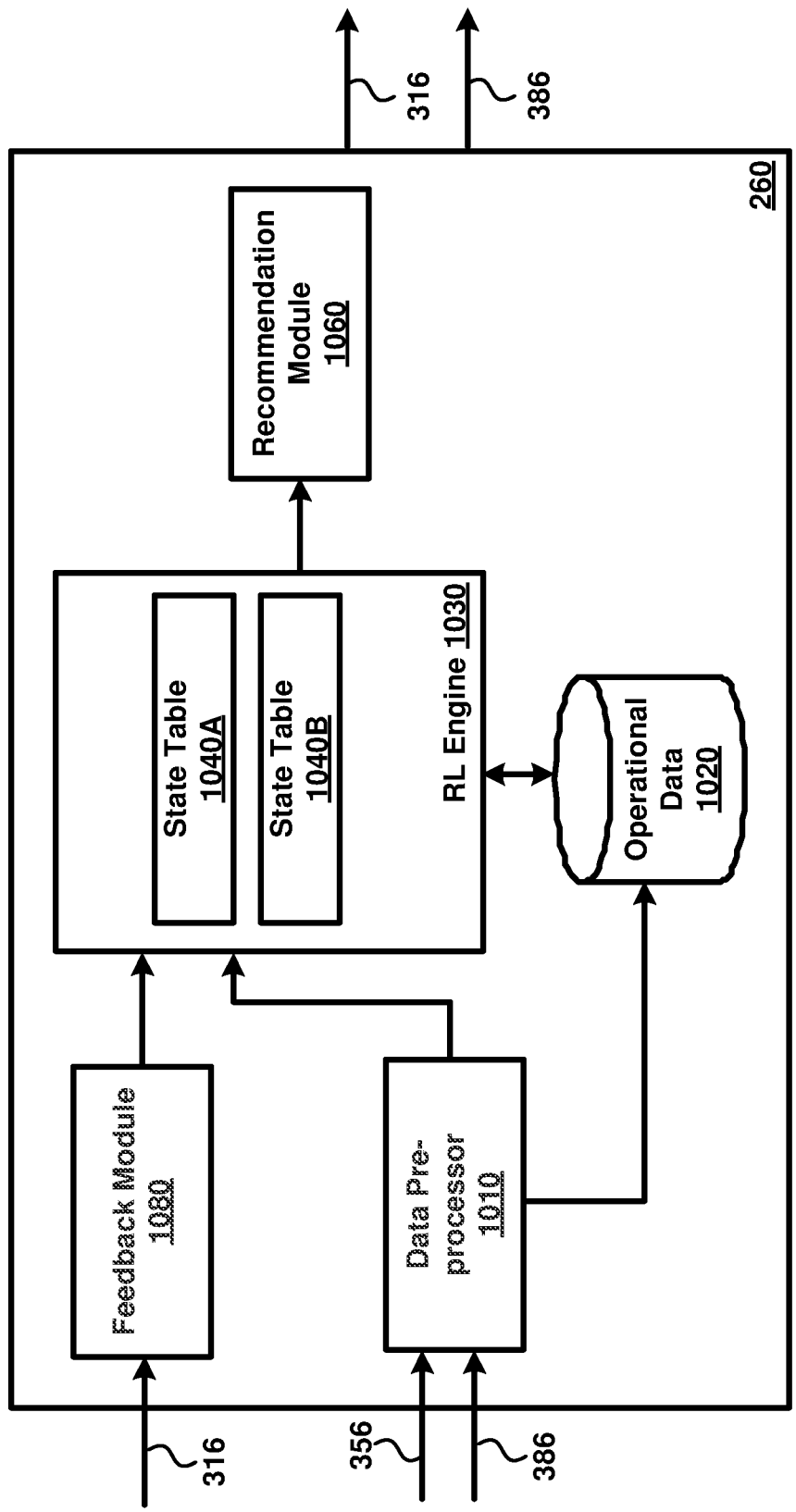
FIG. 10 is a block diagram depicting an implementation of a strategy recommendation module in one embodiment.

FIG. 10 is a block diagram depicting an implementation of a strategy recommendation module (360) in one embodiment. The block diagram is shown containing data pre-processor 1010, operational data store (ODS) 1020, reinforcement learning (RL) engine 1030 (in turn, shown containing state tables 1040A-1040B), recommendation module 1060 and feedback module 1080. Each of the blocks is described in detail below.

Data pre-processor 1010 retrieves the strategy data from data store 180 by interfacing with data interface 180 via path 386 and pre-processes the data similar to the pre-processing noted above with respect to account data. Data pre-processor 1010 also receives via path 356 from agent assignment module 350, the details of the assignments from agents to accounts contained in the target groups. Data pre-processor 1010 stores the pre-processed strategy data and the assignment data in ODS 1020 and also forwards the data to RL engine 1030.

ODS 1020 represents a data store that maintains portions of operation data used by RL engine 1030. Though shown internal to strategy recommendation module 360, in alternative embodiments, ODS 1020 may be implemented external to strategy recommendation module 360, for example, as part of data store 180 as will be apparent to one skilled in the relevant arts by reading the disclosure herein.

RL engine 530 generates various state tables that that correlate the data received from data pre-processor 510. The state tables may be generated using any reinforcement learning (RL) approach. In one embodiment, RL engine 530 employs Q-learning technique. As is well known in the relevant arts, Q-learning technique is based on a set of states and a set of actions permissible in each state. Q-learning technique learns from successful and unsuccessful collection attempts (provided by the data) of the recovery agent, and tries to maximize the rewards (based on maximizing the collection with minimizing the recovery cost) for the selected recovery agent by adjusting the recovery strategy. According to available historical data, the state table is populated with the state capturing the assignments and action being the recovery strategy the agent opts for at each step. The initial state-and-action tables for Q-learning may be provided by an administrator. Various other RL approaches may be employed, as will be apparent to skilled practitioners, by reading the disclosure provided herein.

State tables 1040A-1040B represent Q-learning based Q-tables generated for different use cases specified by a user using the user interfaces of 4A-4C. Each state table specifies recommendation scores for different combinations of states and recovery actions/strategies to be used by the agent. Examples of the states may be 'less than 30 days delinquent', 'more than 30 days delinquent', 'missed usual payment date', 'missed few payments', 'did not pick up reminder call', 'mentioned wrong address', 'recovery successful', etc. and examples of strategies/recovery actions may be text, call, email, home-visit, office-visit, settlement, legal action, etc. The recommendation score indicates an order of preference among the various recovery actions. For example, an agent may be required to perform a recovery action with a high recommendation score (e.g., "Email") before performing a recovery action with a low recommendation score (e.g., "Legal Action").

Recommendation module 1060 determines a recommended recovery strategy for each assignment of agent and account by using one of state tables 1040A-1040B during the prediction stage. The determination of the recommended strategy may be performed in a known way, for example, using the calculations associated with Q-tables well known in the arts. For example, sending SMS/email to a customer may be a low-cost recovery strategy as compared to visiting the customer at home/office. Thus, if the debt amount is high then visit to home can be viable option.

Recommendation module 1060 then provides the details of the accounts in the target groups, the corresponding agent-account assignments and the determined recommended recovery strategy to users/administrators. In one embodiment, the details are provided using appropriate user interfaces by interfacing with UI interface 310 via path 316.

Feedback module 1080 receives (via path 316) the feedback from the agents on the success or failure of the strategy with the corresponding account/customer, and updates state tables 1040A-1040B to reflect the received feedback. As such, strategy recommendation module 360 learns from agent experiences to find out the best recovery strategy for a given state.

Recommendation module 560 also stores the details of the accounts in target groups, the assignments and the recommended recovery strategies in data store 180 (by interfacing with data interface 380) via path 386. Some sample data processed and/or generated by recommendation module 560 is described in detail below.

Figure 11A:
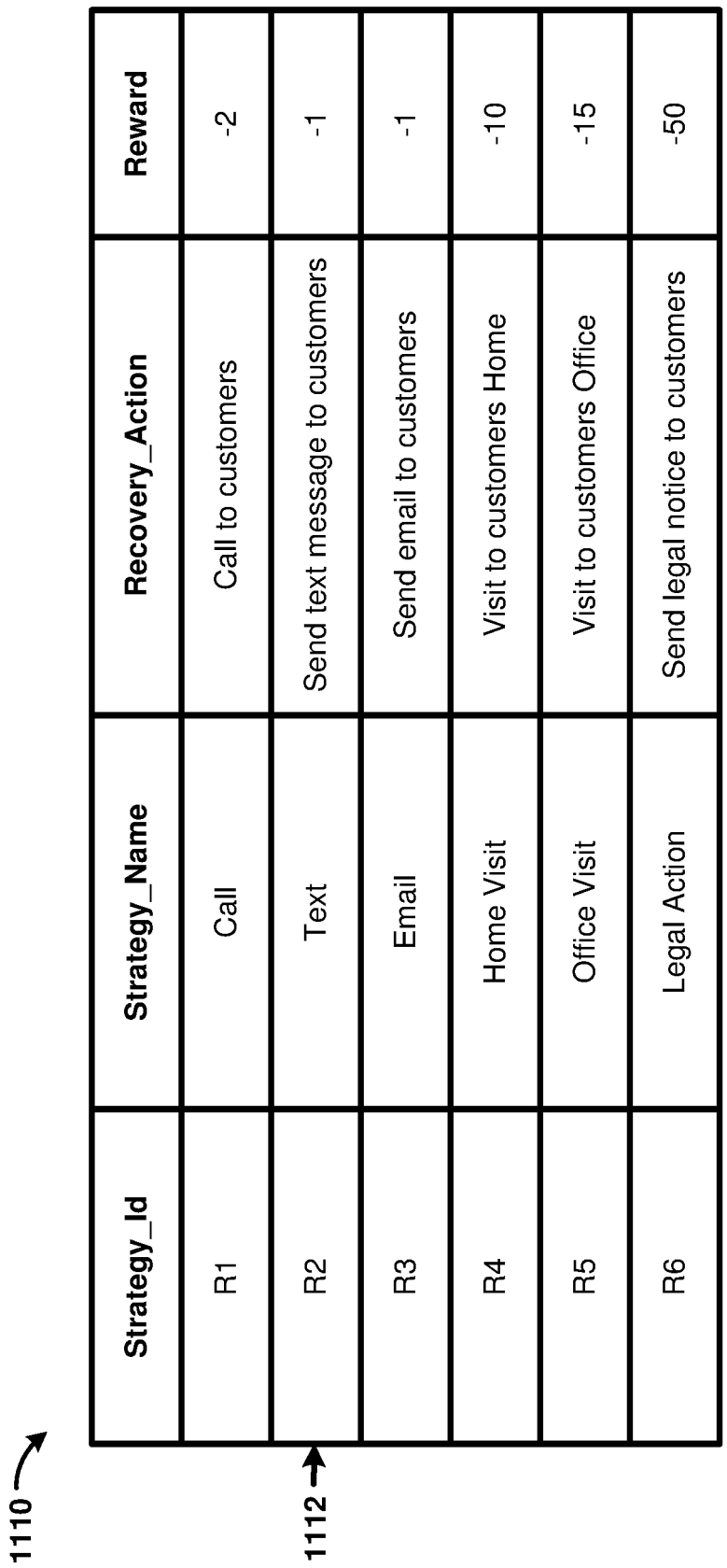
FIG. 11A is a strategy table specifying the details of the recovery strategies in one embodiment.

FIG. 11A is a strategy table (1110) specifying the details of the recovery strategies in one embodiment. In strategy table 1110, each row specifies the details of a corresponding recovery strategy used by agents to recover debts from accounts/customers. The columns indicate the identifiers of the strategy attributes such as Strategy_Id, Strategy_Name, Recovery_Action and Reward, while the corresponding values are specified in the rows. For example, row 1112 indicates the details of a recovery strategy having the respective values of "S2", "Text", "Send text message to customers" and "−1" for the corresponding identifiers Strategy_Id, Strategy_Name, Recovery_Action and Reward. Similarly, the other rows in table 1110 specify the details of other recovery strategies.

FIG. 11B is a state definition table (1150) that defines the various states used in state tables in one embodiment. In state definition table 1110, each row specifies the details of a corresponding state used in state tables 1040A-1040B. The column "State_Id" specifies a unique identifier associated with the state. Columns "Acc_Attribute_Condition", "Agent_Attribute_Condition" and "Action_Condition" specify various conditions associated with account attributes, agent attributes and recovery actions respectively that represent the state, while column "Description" specifies a descriptive text capturing the conditions. It should be noted that the various values such as "High", "Low", "Few Non-Payment", "Less", "High", "Fail", etc. represent pre-defined thresholds/value ranges. For example, "High" may represent a pre-defined value of "500000", "Few Non-Payment" may represent a range of values 1-10, while "Fail" may represent a pre-defined threshold of the failure of an agent to contact/interact with an account/customer using the corresponding recovery action.

For example, row 1131 indicates that state S1 (value in column "State_Id") is represented by the conditions Acc_Loan_Amt (account loan amount) is High and Agent_Work_Exp (agent work experience) is Less only, with no recovery action condition specified (as indicated by the value "None" in that column). The value in "Description" column in row 1131 accordingly indicates "High loan amount with less experiences recovery agent". Similarly, the other rows in state definition table 1150 specify the definition of other states.

It may be appreciated that in rows 1131 and 1134, the value in column "Action_Condition" is "None" indicating that the state does not represent any condition associated with recovery actions. Such states not associated with any recovery actions (value "None" in column "Action_Condition") may be viewed as initial states generated (by RL engine 1030) based only on the account attributes and agent attributes contained in the assignments of assignment table 950. Upon receiving feedback from agents via feedback module 1080, RL engine 1030 generates additional states capturing the feedback. For example, upon receiving feedback from an agent of the failure of the agent to contact/interact with an account/customer (initially in state S1) using the corresponding recovery action "Call", RL engine 1030 may define a new state S2 that captures the "Call" failure as shown in row 1132. Upon receiving further feedback of failure of additional recovery actions "Text" and "Email", RL engine 1030 may define an additional new state S3 that capture all the three failures as shown in row 1133. The newly defined states are then used in the generation/update of state tables 1040A-1040B.

FIG. 11C is a state table (1150) specifying the various tradeoffs between states and recovery actions/strategies in one embodiment. In particular, state table 1150 is a Q-table generated according to Q-learning reinforcement learning approach. Each column (along the direction 1160) specifies a recovery strategy, while each row (along the direction 1170) specifies a state defined in state definition table 1130. It may be observed that table 1150 includes a column "Drop Recovery" indicating that the agent should not be performing any further recovery actions. Each cell at the intersection of a row/state and a column/strategy specifies a recommendation score i.e., a futuristic reward associated with the corresponding combination of state and strategy/recovery action. In one embodiment, a higher value for the recommendation score indicates that the associated recovery action has to be performed before a recovery action associated with a lower value as it has a promise of higher rewards in future.

For example, row 1171 indicates that for an assignment that satisfies the conditions (in row 1131 of table 1130) corresponding to state S1, the order of (preference of) performance of recovery actions is the sequence "Text" followed by "Email" followed by "Call" followed by "Home Visit"/"Office Visit", etc. as indicated by the corresponding recommendation scores 0.2, 0.15, 0.1, 0.05, etc. It may be appreciated that row 1176 indicates that for an assignment in state S6, the best action is "Drop Recovery", that is perform no further recovery actions. Similarly, the other rows in state table 1150 specify a corresponding sequence of recovery actions to be performed by an agent for other states defined in state definition table 1130.

Figure 11D:
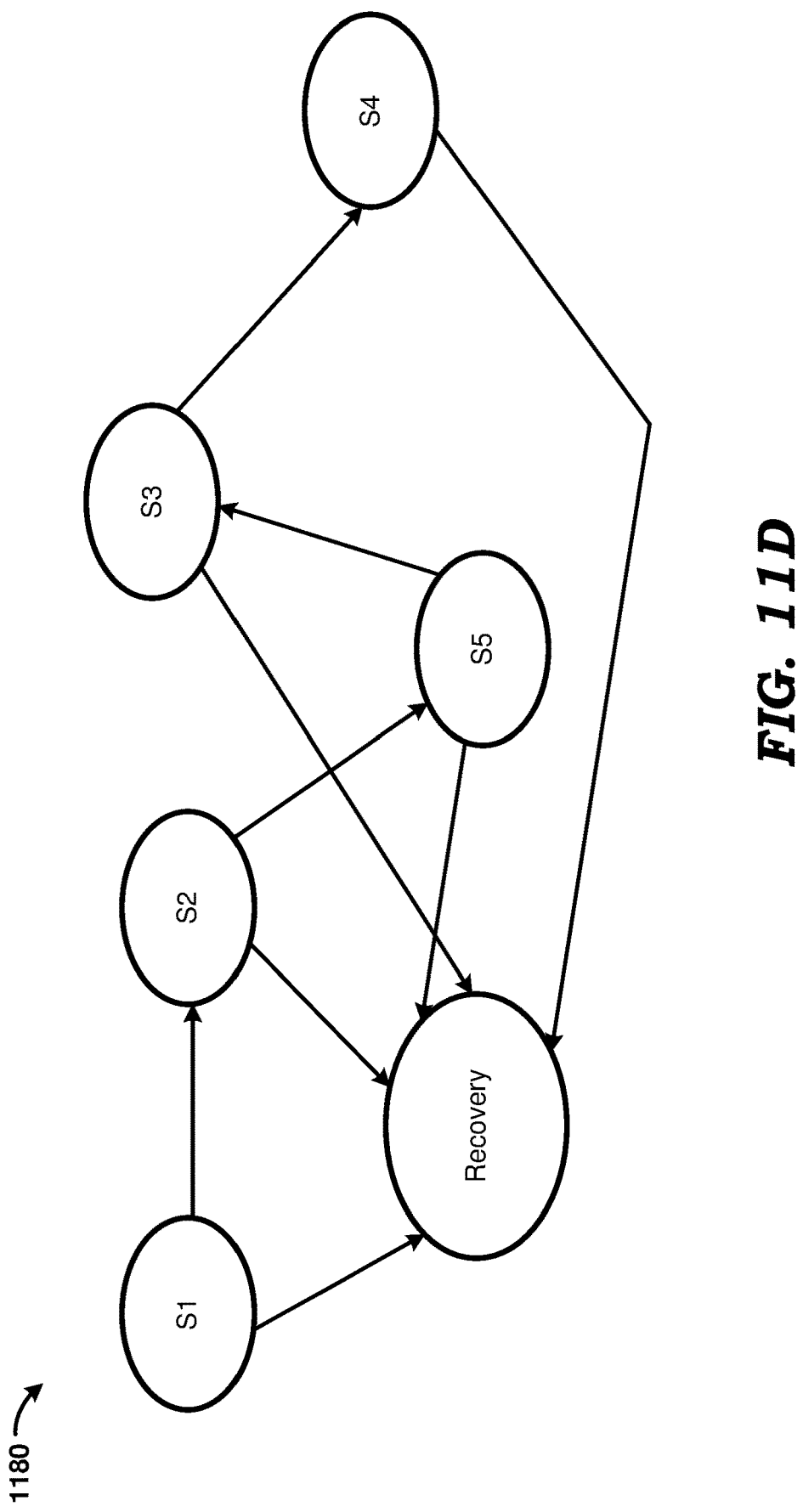
FIG. 11D illustrates the manner of operation of recovery actions in debt collection in one embodiment.

FIG. 11D illustrates the manner of operation of recovery actions in debt collection in one embodiment. In particular, state diagram 1180 depicts the various states defined by RL engine 1030 as part of state definition table 1130 and the state "Recovery" representing successful or failure in debt collection. State diagram 1180 also depicts various transitions (represented as arrows) between the states, with each transition representing success or failure in the collection of a debt based on performance of a corresponding recovery action.

It may be appreciated that in addition to the rewards associated with each recovery action as shown in table 1110, a successful recovery may be associated with a reward of +100 while a failed/dropped recovery may be associated with a reward of −100. Accordingly, state diagram 1180 may be used to optimize the collection strategy of a set of agents belonging to a financial institution such that the total reward (sum of rewards of all recovery actions performed as well as successful/failed recovery) is maximized.

Referring again to FIG. 10, recommendation module 1060 also facilitates users/administrators to view the details of the accounts, assignments and recommended strategies by interfacing with UI interface 310 via path 314. A sample user interface that may be provided to users/administrators for viewing such details is described in detail below.

FIG. 12 depicts a user interface provided to a user/administrator for viewing the details of the accounts of a targeted group in one embodiment. Display area 1220 shows the various accounts of target groups, corresponding assignments and recommended recovery strategies. Display area 1250 shows the corresponding details for a single target group/cluster namely "Cluster-7". Similarly, the details of other target groups/clusters may be provided.

In particular, display area 1250 shows the details of the accounts in the cluster that are deemed to be potentially delinquent, the corresponding agent assigned to each of the accounts and a recommended recovery strategy for each assignment. Column 1255 "Recommended Strategy Sequence" indicates the sequence of recovery actions (ordered with futuristic reward in descending order) to be performed by the corresponding agent.

Thus, aspects of the presented disclosure are directed to an AI (Artificial Intelligence) based technology system that assists financial institutions in debt collection. As noted above, AI/ML is used to first cluster customer accounts into different groups. Recovery agents are then assigned to corresponding groups of customers using a classification model. AI/ML is again used to recommend an optimum recovery strategy to each account for the assigned recovery agent to apply. User feedback is incorporated to further refine the predictions of recovery strategies.

It may be appreciated that AI/ML capabilities may help build a more accurate recovery system that helps save businesses' revenue by identifying the cause and delay of late payment before time and making accurate decisions to recover the money before customer default. It may also be appreciated that the proposed system is an automatic system to make better and data-oriented decisions at different stages of the collection/recovery process. There is a minimal requirement of human intervention in the intermediate stages.

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 13:
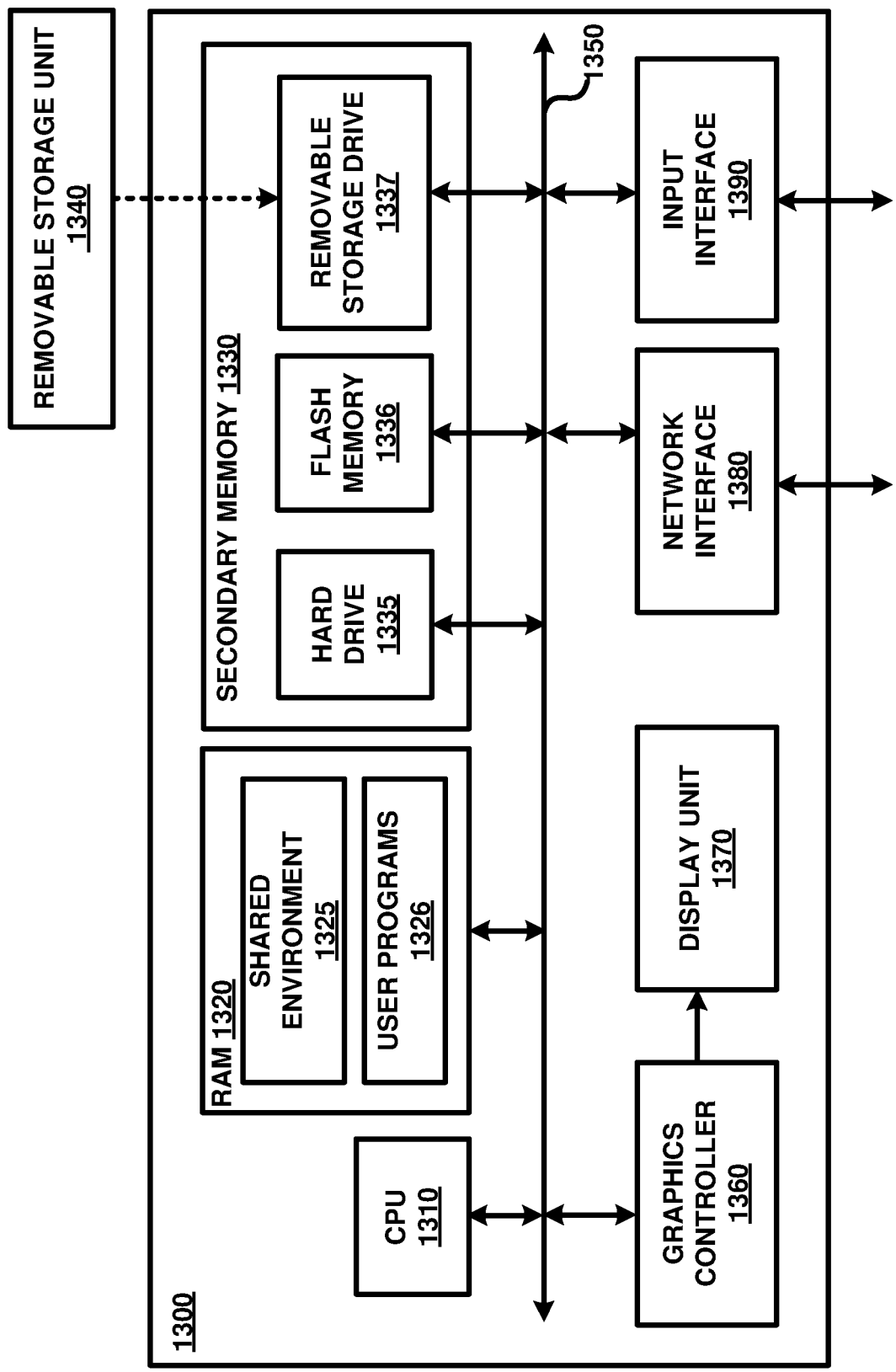
FIG. 13 is a block diagram illustrating the details of a digital processing system in which various aspects of the present disclosure are operative by execution of appropriate executable modules.

FIG. 13 is a block diagram illustrating the details of digital processing system (1300) in which various aspects of the present disclosure are operative by execution of appropriate executable modules. Digital processing system 1300 may correspond to debt collection manager 150 (or any system implementing debt collection manager 150).

Digital processing system 1300 may contain one or more processors such as a central processing unit (CPU) 1310, random access memory (RAM) 1320, secondary memory 1330, graphics controller 1360, display unit 1370, network interface 1380, and input interface 1390. All the components except display unit 1370 may communicate with each other over communication path 1350, which may contain several buses as is well known in the relevant arts. The components of FIG. 13 are described below in further detail.

CPU 1310 may execute instructions stored in RAM 1320 to provide several features of the present disclosure. CPU 1310 may contain multiple processing units, with each processing unit potentially being designed for a specific task. Alternatively, CPU 1310 may contain only a single general-purpose processing unit.

RAM 1320 may receive instructions from secondary memory 1330 using communication path 1350. RAM 1320 is shown currently containing software instructions constituting shared environment 1325 and/or other user programs 1326 (such as other applications, DBMS, etc.). In addition to shared environment 1325, RAM 1320 may contain other software programs such as device drivers, virtual machines, etc., which provide a (common) run time environment for execution of other/user programs.

Graphics controller 1360 generates display signals (e.g., in RGB format) to display unit 1370 based on data/instructions received from CPU 1310. Display unit 1370 contains a display screen to display the images defined by the display signals (e.g., portions of the user interfaces shown in FIGS. 4A-4B, 7A-7E and 12). Input interface 1390 may correspond to a keyboard and a pointing device (e.g., touch-pad, mouse) and may be used to provide inputs (e.g., in the user interfaces shown in FIGS. 4A-4B, 7A-7E and 12). Network interface 1380 provides connectivity to a network (e.g., using Internet Protocol), and may be used to communicate with other systems connected to the networks.

Secondary memory 1330 may contain hard drive 1335, flash memory 1336, and removable storage drive 1337. Secondary memory 1330 may store the data (e.g., data portions of FIGS. 6A-6C, 9A-9B and 11A-11B) and software instructions (e.g., for implementing the steps of FIG. 2, for implementing the blocks of FIGS. 3, 5, 8 and 10), which enable digital processing system 1300 to provide several features in accordance with the present disclosure. The code/instructions stored in secondary memory 1330 may either be copied to RAM 1320 prior to execution by CPU 1310 for higher execution speeds, or may be directly executed by CPU 1310.

Some or all of the data and instructions may be provided on removable storage unit 1340, and the data and instructions may be read and provided by removable storage drive 1337 to CPU 1310. Removable storage unit 1340 may be implemented using medium and storage format compatible with removable storage drive 1337 such that removable storage drive 1337 can read the data and instructions. Thus, removable storage unit 1340 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1340 or hard disk installed in hard drive 1335. These computer program products are means for providing software to digital processing system 1300. CPU 1310 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1330. Volatile media includes dynamic memory, such as RAM 1320. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1350. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for assisting financial institutions in debt collection, wherein execution of said one or more instructions by one or more processors contained in a digital processing system cause said digital processing system to perform the actions of:

maintaining an account data specifying account attributes of a plurality of accounts, said account data indicating a specific set of accounts of said plurality of accounts as being delinquent;

receiving a feature set comprising a set of account attributes of said account attributes;

clustering, using a first machine learning (ML) approach, said plurality of accounts to determine a set of groups, wherein said first ML approach operates to group accounts based on said account attributes while giving higher weightage to said set of account attributes, each group of said set of groups being associated with a respective set of group qualifiers, each group qualifier specifying a corresponding range of values for a respective attribute of said account attributes, wherein a first clustering ML approach is used as said first ML approach if a desired count of a number of groups in said set of groups is received with said feature set, and a second clustering ML approach is used if said desired count is not received;

generating, using a second ML approach, a multi-classification model for assignment of a plurality of agents to respective accounts, wherein said second ML approach correlates a set of recovery attributes of each agent and said respective set of group qualifiers, while giving higher weightage to said set of account attributes contained in said feature set;

identifying a target group of said set of groups containing a material number of said specific set of accounts indicated to be delinquent and a subset of accounts which are indicated not to be delinquent in said account data;

assigning, using said multi-classification model, a corresponding agent for each account in said subset of accounts;

determining a recommended recovery strategy for each assignment of corresponding agent and account contained in said subset of accounts; and providing details of said subset of accounts, said corresponding agent assigned to each of said subset of accounts and said recommended recovery strategy for each assignment.

2. The non-transitory machine-readable medium of claim 1, wherein said second clustering ML approach is used if said desired count is not received and if said account data does not contain nested attributes, wherein a third clustering ML approach is used if said desired count is not received and if said account data contains nested attributes, wherein said clustering comprises:

generating using said first ML approach, a ML clustering model based on said account data and said feature set; and predicting said set of groups based on said ML clustering model.

3. The non-transitory machine-readable medium of claim 2, wherein said first clustering ML approach is K-Means technique, wherein said second clustering ML approach is O-Clustering technique and wherein said third clustering ML approach is Expectation maximization technique.

4. The non-transitory machine-readable medium of claim 1, wherein said account data also specifies a corresponding delinquency status for each account, wherein said identifying identifies a probability of delinquency for said first group based on weights associated with the corresponding delinquency statuses of the accounts contained in said target group.

5. The non-transitory machine-readable medium of claim 1, wherein said generating comprises one or more instructions for:

training a plurality of machine learning (ML) classification models based on said set of recovery attributes of each agent of said plurality of agents and said respective set of group qualifiers of said set of groups; and selecting a suitable ML classification model from said plurality of ML classification models as said multi-classification model.

6. The non-transitory machine-readable medium of claim 5, wherein said plurality of ML classification models employs one or more of logistic regression, SVMs, ensemble trees, boosting trees, naive Bayes, KNN (k-nearest neighbors) and shallow neural networks, wherein said selecting said suitable ML classification model is performed based on one or more of confusion matrix, accuracy, precision, recall, F1 score, ROC Curve, and gain and lift chart.

7. The non-transitory machine-readable medium of claim 1, wherein said determining comprises:

maintaining a reinforcement learning (RL) state table correlating a set of states to a set of strategies, said set of states representing corresponding combinations of group qualifiers and agent attributes; and identifying, for a first assignment of a first agent and a first account contained in said first group, a first strategy of said set of strategies as said recommended recovery strategy using said RL state table, a group qualifier associated with said first group and an agent attribute associated with said first agent, wherein the actions further comprise:

displaying on a display unit, said set of groups organized in the form of a hierarchy of nodes with each node corresponding to a group such that said hierarchy represents output of said first ML approach, wherein each target group in said set of groups is represented as a corresponding leaf node of said hierarchy.

8. The non-transitory machine-readable medium of claim 7, further comprising one or more instructions for:

receiving from said first agent, a feedback on the success or failure of said first strategy with said first account; and updating said RL state table to reflect said feedback.

9. The non-transitory machine-readable medium of claim 8, wherein said RL state table is a Q-table employing Q-Learning algorithm.

10. A computer implemented method for assisting financial institutions in debt collection, said method being performed in a digital processing system, said method comprising:

maintaining in a memory of said digital processing system, an account data specifying account attributes of a plurality of accounts, said account data indicating a specific set of accounts of said plurality of accounts as being delinquent;

receiving via a user interface module, a feature set comprising a set of account attributes of said account attributes;

providing in said digital processing system a first machine learning (ML) approach and a second ML approach by execution of corresponding instructions;

clustering, by an account segmentation module using said first ML approach, said plurality of accounts to determine a set of groups, wherein said first ML approach operates to group accounts based on said account attributes while giving higher weightage to said set of account attributes, each group of said set of groups being associated with a respective set of group qualifiers, each group qualifier specifying a corresponding range of values for a respective attribute of said account attributes;

generating, by an agent assignment module using said second ML approach, a multi-classification model for assignment of a plurality of agents to respective accounts, wherein said second ML approach correlates a set of recovery attributes of each agent and said respective set of group qualifiers, while giving higher weightage to said set of account attributes contained in said feature set;

identifying by said account segmentation module, a target group of said set of groups likely to present problems with debt collection, wherein said target group contains a material number of said specific set of accounts indicated to be delinquent and a subset of accounts which are indicated not to be delinquent in said account data;

assigning, by said agent assignment module using said multi-classification model, a corresponding agent for each account in said subset of accounts;

determining, by a strategy recommendation module, a recommended recovery strategy for each assignment of corresponding agent and account contained in said subset of accounts; and providing details of said subset of accounts, said corresponding agent assigned to each of said subset of accounts and said recommended recovery strategy for each assignment.

11. The method of claim 10, wherein said clustering comprises:
generating a machine learning (ML) clustering model based on said account data and said feature set; and
predicting said set of groups based on said ML clustering model.

12. The method of claim 10, wherein said account data also specifies a corresponding delinquency status for each account,
wherein said identifying identifies a probability of delinquency for said first group based on weights associated with the corresponding delinquency statuses of the accounts contained in said target group.

13. The method of claim 10, wherein said generating comprises:
training a plurality of machine learning (ML) classification models based on said set of recovery attributes of each agent of said plurality of agents and said respective set of group qualifiers of said set of groups; and
selecting a suitable ML classification model from said plurality of ML classification models as said multi-classification model.

14. The method of claim 10, wherein said determining comprises:
maintaining a reinforcement learning (RL) state table correlating a set of states to a set of strategies, said set of states representing corresponding combinations of group qualifiers and agent attributes; and
identifying, for a first assignment of a first agent and a first account contained in said first group, a first strategy of said set of strategies as said recommended recovery strategy using said RL state table, a group qualifier associated with said first group and an agent attribute associated with said first agent.

15. The method of claim 14, further comprising:
receiving from said first agent, a feedback on the success or failure of said first strategy with said first account; and
updating said RL state table to reflect said feedback.

16. A digital processing system comprising:
a random access memory (RAM) to store instructions for assisting financial institutions in debt collection; and
one or more processors to retrieve and execute the instructions, wherein execution of the instructions causes the digital processing system to perform the actions of:
maintaining an account data specifying account attributes of a plurality of accounts, said account data indicating a specific set of accounts of said plurality of accounts as being delinquent;
receiving a feature set comprising a set of account attributes of said account attributes;
clustering, using a first machine learning (ML) approach, said plurality of accounts to determine a set of groups, wherein said first ML approach operates to group accounts based on said account attributes while giving higher weightage to said set of account attributes, each group of said set of groups being associated with a respective set of group qualifiers, each group qualifier specifying a corresponding range of values for a respective attribute of said account attributes,
wherein a first clustering ML approach is used as said first ML approach if a desired count of a number of groups in said set of groups is received with said feature set, and a second clustering ML approach is used if said desired count is not received;
generating, using a second ML approach, a multi-classification model for assignment of a plurality of agents to respective accounts, wherein said second ML approach correlates a set of recovery attributes of each agent and said respective set of group qualifiers, while giving higher weightage to said set of account attributes contained in said feature set;
identifying a target group of said set of groups containing a material number of said specific set of accounts indicated to be delinquent and a subset of accounts which are indicated not to be delinquent in said account data;
assigning, using said multi-classification model, a corresponding agent for each account in said subset of accounts;
determining a recommended recovery strategy for each assignment of corresponding agent and account contained in said subset of accounts; and
providing details of said subset of accounts, said corresponding agent assigned to each of said subset of accounts and said recommended recovery strategy for each assignment.

17. The digital processing system of claim 16,
wherein said second clustering ML approach is used if said desired count is not received and if said account data does not contain nested attributes,
wherein a third clustering ML approach is used if said desired count is not received and if said account data contains nested attributes,
wherein for said clustering, said digital processing system performs the actions of:
generating using said first ML approach, a ML clustering model based on said account data and said feature set; and
predicting said set of groups based on said ML clustering model.

18. The digital processing system of claim 16, wherein said account data also specifies a corresponding delinquency status for each account,
wherein said identifying identifies a probability of delinquency for said first group based on weights associated with the corresponding delinquency statuses of the accounts contained in said target group.

19. The digital processing system of claim 16, wherein for said generating, said digital processing system performs the actions of:

training a plurality of machine learning (ML) classification models based on said set of recovery attributes of each agent of said plurality of agents and said respective set of group qualifiers of said set of groups; and selecting a suitable ML classification model from said plurality of ML classification models as said multi-classification model.

20. The digital processing system of claim 16, wherein said for determining, said digital processing system performs the actions of:

maintaining a reinforcement learning (RL) state table correlating a set of states to a set of strategies, said set of states representing corresponding combinations of group qualifiers and agent attributes; and identifying, for a first assignment of a first agent and a first account contained in said first group, a first strategy of said set of strategies as said recommended recovery strategy using said RL state table, a group qualifier associated with said first group and an agent attribute associated with said first agent.

* * * * *